United States Patent [19]

Kawasaki et al.

[11] Patent Number: 5,210,616
[45] Date of Patent: May 11, 1993

[54] SHEET CARRIER APPARATUS AND A PICTURE IMAGE RECORDING APPARATUS

[75] Inventors: Keiichi Kawasaki, Tokyo; Keiji Ohkoda; Tomohiro Kudo, both of Yokohama; Satoshi Shimizu, Yokohama, all of Japan

[73] Assignee: Canon Kabushiki Kaisha, Tokyo, Japan

[21] Appl. No.: 543,413

[22] Filed: Jun. 26, 1990

[30] Foreign Application Priority Data

| Jun. 30, 1989 [JP] | Japan | 1-169425 |
| Dec. 15, 1989 [JP] | Japan | 1-325004 |
| Dec. 15, 1989 [JP] | Japan | 1-326926 |
| Mar. 2, 1990 [JP] | Japan | 2-50854 |
| Mar. 2, 1990 [JP] | Japan | 2-50856 |
| Mar. 26, 1990 [JP] | Japan | 2-77654 |
| Apr. 25, 1990 [JP] | Japan | 2-109327 |
| Apr. 27, 1990 [JP] | Japan | 2-111969 |

[51] Int. Cl.$^5$ .............................. H04N 1/21
[52] U.S. Cl. .......................... 358/296; 271/11; 271/185; 271/225; 271/274; 271/275
[58] Field of Search ............ 271/225, 272, 273, 274, 271/275, 277, 184, 185, 11, 114, 121, 124, 125

[56] References Cited

U.S. PATENT DOCUMENTS

| 3,659,838 | 5/1972 | Davis | 271/11 |
| 4,256,299 | 3/1981 | Hogenson | 271/262 |
| 4,402,497 | 9/1983 | Weibel et al. | 271/11 |
| 4,690,394 | 9/1987 | Maul et al. | 271/104 X |
| 4,745,416 | 5/1988 | Horihata | 358/296 X |
| 4,796,035 | 1/1989 | Kawasaki et al. | 346/108 |
| 4,858,909 | 8/1989 | Stemmle | 271/184 |

FOREIGN PATENT DOCUMENTS

| 3110790 | 1/1982 | Fed. Rep. of Germany . |
| 3135588 | 11/1983 | Fed. Rep. of Germany . |
| 0248841 | 11/1986 | Japan | 271/262 |
| 0277139 | 11/1988 | Japan | 271/121 |
| 2073153A | 10/1981 | United Kingdom . |

Primary Examiner—D. Glenn Dayoan
Assistant Examiner—Carol Lynn Drazbick
Attorney, Agent, or Firm—Fitzpatrick, Cella, Harper & Scinto

[57] ABSTRACT

A sheet carrier apparatus of the present invention includes a first and a second rotary roller member, at least one of them having a rotary driving force. The second rotary roller member is constructed so as to be able to rotate around the first rotary roller member while it is being driven by the first rotary roller member. In order to control these rollers, the sheet carrier apparatus includes a control device for selectively setting the direction in which a sheet is moved from among a plurality of directions by controlling the rotary driving of the rotary roller members while carrying a sheet and by controlling the degree of angular displacement causing the second rotary roller member to rotate around the first rotary roller member while a sheet is grasped between them.

78 Claims, 14 Drawing Sheets

SHEET CARRIER APPARATUS AND A PICTURE IMAGE RECORDING APPARATUS

BACKGROUND OF THE INVENTION

1. Field of the Invention

The present invention relates to a sheet carrier apparatus having a mechanism for changing the direction in which sheets to be carried are moved and a picture image recording apparatus equipped with the sheet carrier apparatus.

2. Related Background Art

To change the course in which a sheet is carried along a carrier path, for example, the mechanism shown in FIGS. 24 and 25 has been generally used.

FIG. 24 shows an example of a mechanism for changing the course of sheets to be carried in a given direction. Numeral 53 denotes a rubber belt, which is pulled by a suitable tensile force between rollers 51 and 52 which are rotatable around fixed shafts. A sheet to be carried is pressed against a main roller 41 and grasped between the roller 41 and the small rollers 51 and 52. The main roller 41 is driven to rotate so as to change the direction in which a carrier sheet is carried.

FIG. 25 shows an example of a mechanism for selecting the course of a carrier sheet from among a plurality of given directions by using a guide plate. Numeral 80 denotes a movable guide plate. Selection of a state shown by either a solid line or a dotted line can be made, which allows the direction of the course of a carrier sheet to be selected from between the directions P and Q.

In the above-mentioned embodiment shown in FIG. 24, however, the direction of the course of a carrier sheet cannot be changed except in a predetermined direction. Nor, in the example of the prior art shown in FIG. 25, can a change of course be made except in a plurality of predetermined directions.

Further, in the example of the prior art shown in FIG. 25, where a sheet to be carried is a film or the like, if the curvature of a carrier path by means of a guide plate is small, there is a possibility that the surface of a film curved along the carrier path will rub against the guide plate when the course is changed, thereby causing damage to the emulsion coating of the film and deteriorating the recorded picture image.

An apparatus is disclosed in U.S. Pat. No. 3,659,838, U.S. Pat. No. 4,256,299, and U.S. Pat. No. 4,858,909, which has a mechanism by which one of a pair of rotary rollers that carry a sheet by grasping it in a fastened state can move around the other roller planetarily and can carry out a sheet in a given direction different from the direction in which the sheet was inserted between a roller pair.

However, these mechanisms permit sheets to be carried only in a predefined direction and lack a degree of freedom. Practically, they only provide a function equivalent to a guide plate.

SUMMARY OF THE INVENTION

An object of the present invention is to provide a sheet carrier apparatus which is capable of switching the course of a sheet in any direction in a small space without causing damage to the surface of the sheet to be carried.

Another object of the present invention is to provide a compact picture image recording apparatus having the sheet carrier apparatus, which is capable of obtaining a high-quality picture image.

These and other objects, features and advantages of the present invention will become clear when reference is made to the following description of the preferred embodiments of the present invention, together with reference to the accompanying drawings.

DESCRIPTION OF THE PREFERRED EMBODIMENTS

Several embodiments in which the present invention is used in a picture image recording apparatus which records picture images on a recording sheet with radiation energy such as a light beam or the like will be explained in detail hereinbelow. The range of applications of the present invention is not limited to a picture image recording apparatus. The present invention can be widely used in an apparatus having a sheet carrier mechanism for carrying sheet-like members, such as a picture image reading apparatus and copiers. A recording sheet to be used is a light-sensitive sheet-like recording medium suitable for the light wavelength of a light beam. For example, a silver salt film or a storage type fluorescent sheet is generally used.

Figure 1:
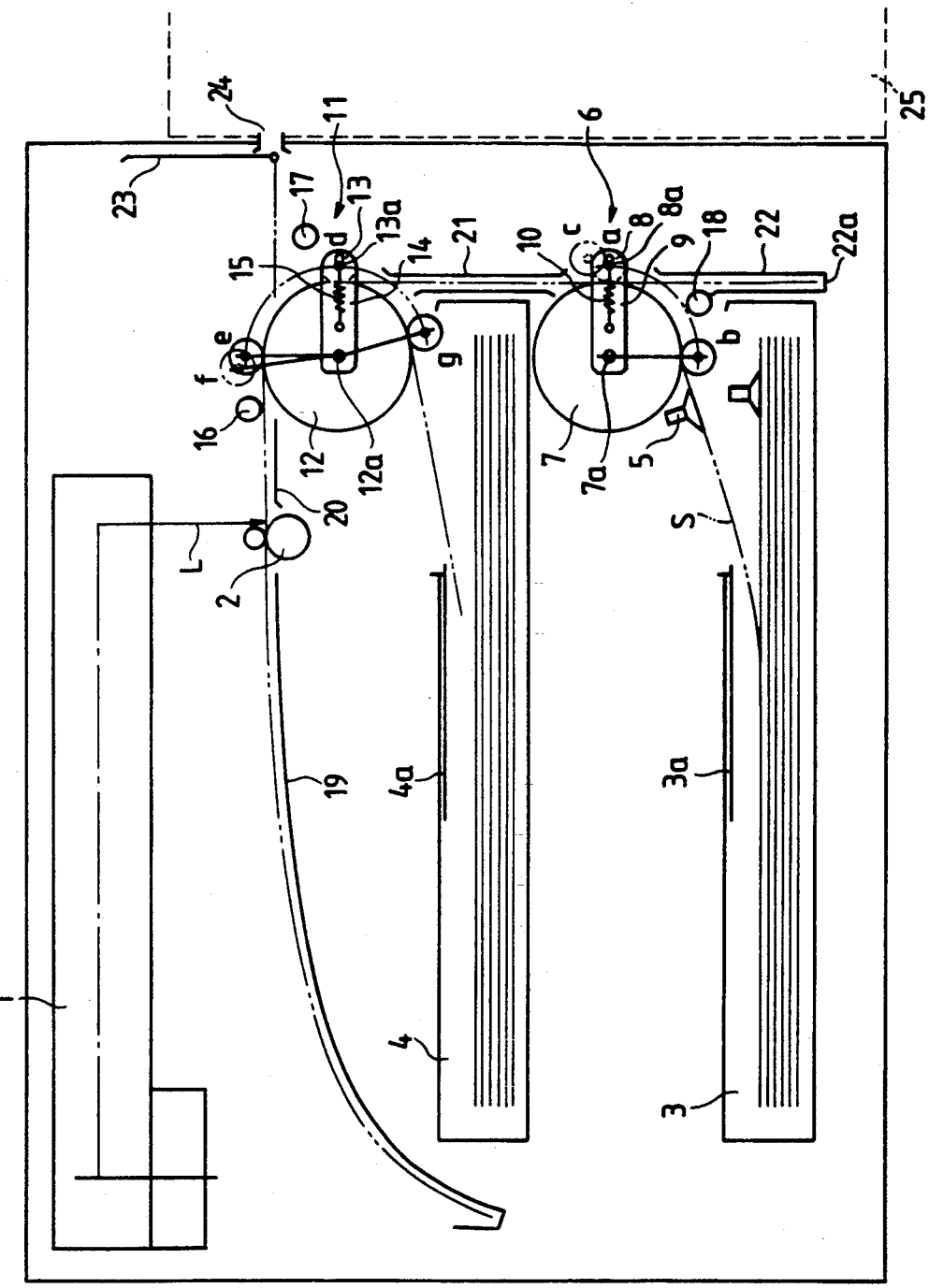
FIG. 1 is a view of the construction of an embodiment in which the present invention is used in a picture image recording apparatus.

FIG. 1 is a view of the construction of a first embodiment of the present invention. Shown in the figure is a laser optical unit 1 which includes a laser light source for a semiconductor laser, a gas laser, etc., a light modulation means such as a modulation control circuit, a light modulator, etc., a scanning optical member for a polygonal mirror, a mirror, or the like and which deflects a laser beam L modulated according to a picture image signal in the direction of main scanning by using the rotation of the polygonal mirror and which scans the film surface at the recording position with light. While a sheet is being supplied, the laser beam is screened from the recording position by means of an unillustrated shutter. Sub-scanning rollers 2 are placed below the laser optical system 1. The sub-scanning rollers 2 are a roller pair, one of which has a rotary driving force and the other of which moves subordinately. It carries a sheet grasped between the two rollers at a fixed speed and performs sub-scanning for picture image recording. The vicinity of the sub-scanning rollers 2 is scanned with a laser beam L from the laser optical system 1. Below the sub-scanning rollers 2 are placed in parallel a supply magazine 3 for stacking and housing unrecorded sheets and a receiving magazine 4 for housing recorded sheets, in order from the bottom. Slide lids 3a and 4a which can be opened and closed for putting in and taking out sheets are disposed in the top surface of each of the magazines 3 and 4, respectively. In a state in which the slide lids 3a and 4a are closed, the inside of the magazines are shut off from the outside light. The film emulsion coatings of sheets stacked inside magazines 3 and 4 face downward so that the light shielding effect is further improved.

Numeral 5 denotes a suction cup which is disposed to take out sheets housed in the supply magazine 3 one by one from the magazine opening. Numeral 6 denotes a direction switching unit which controls the course direction of the sheets to be carried.

Figure 2:
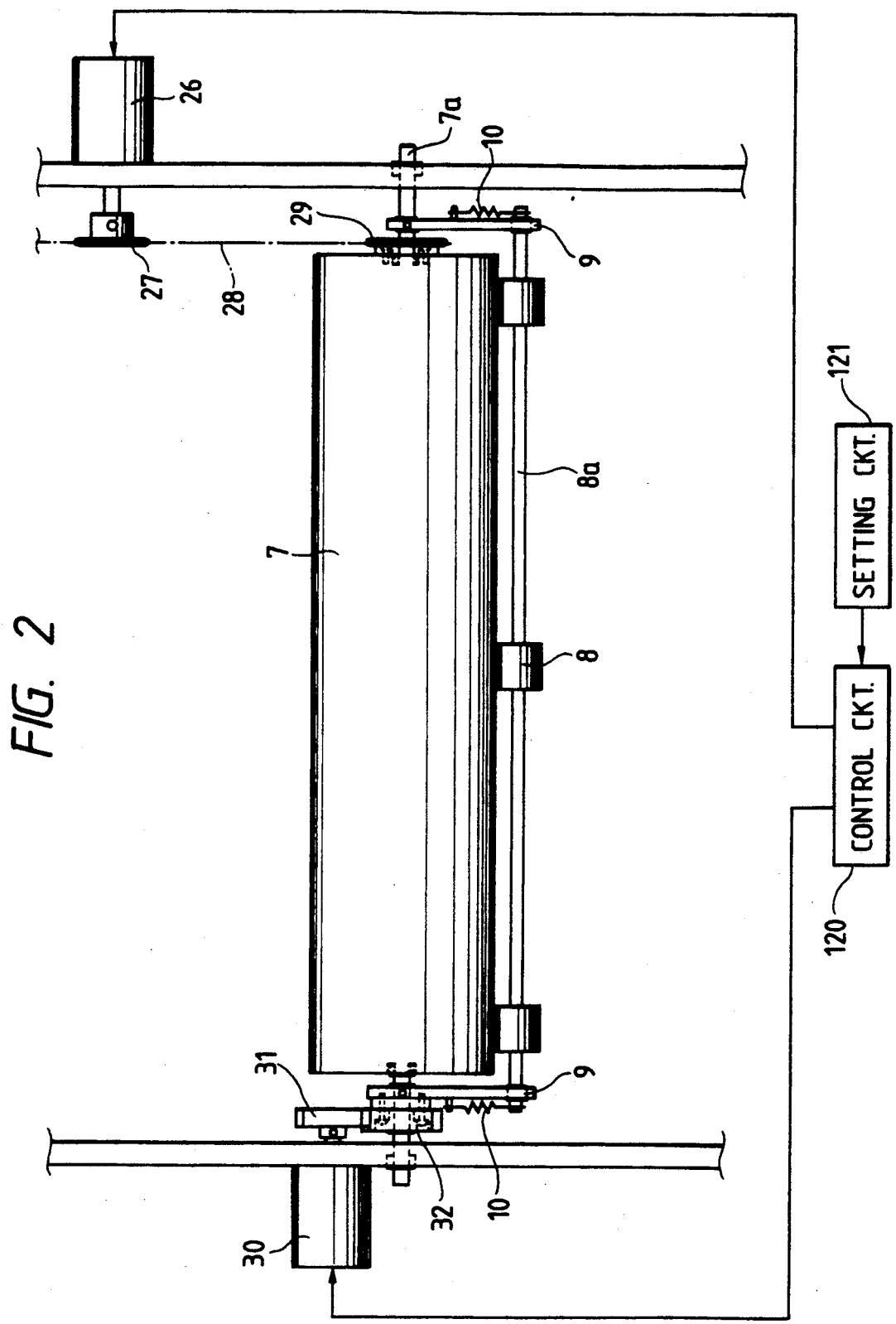
FIG. 2 is a detailed view of a roller unit.

FIG. 2 is a detailed top plan view of the direction switching unit 6. The driving roller 7 can be rotated in both directions by the driving of a motor 26 transmitted by a chain 28, and sprockets 27 and 29. A shaft 7a is driven by a motor 30, and gears 31 and 32, and controls the operation of a lever 9 fixed on the shaft 7a independently of the rotation of the driving roller. An unillustrated encoder is connected to the shaft 7a, and the planetary rotary movement of a subordinate roller 8 can be detected from the output of the encoder. The subordinate roller 8 is rotatably supported by a shaft 8a. The shaft 8a is energized by a spring 10 along a slit disposed in the lever 9. Incidentally, if the surface of the subordinate roller 8 is machined smoothly and has a small friction resistance, it need not necessarily be rotatable. The subordinate roller 8 planetarily rotates around the driving roller as the lever 9 is rotated and is pressed against the driving roller 7 by means of a spring 10. When the lever 9 is rotated and the subordinate roller 8 moves to the position c from the position a, the shaft of the subordinate roller 8 is guided by an unillustrated guide pin and the subordinate roller 8 is separated from the position of the outer circumference of the driving roller 7.

This construction will be explained in more detail with reference to FIGS. 9A and 9B. A slit 9a is disposed in the periphery of the lever 9. The rotary shaft 8a of the subordinate roller 8 is fitted to the slit 9a and the subordinate roller 8 can be separated from the driving roller 7 along the slit 9a. A taper member 48 forming an inclined plane to the direction around the shaft 8a is disposed at a predetermined position on the rotary path of the subordinate roller 8 and the shaft 8a is brought into abutment with the inclined plane.

Figure 9A:
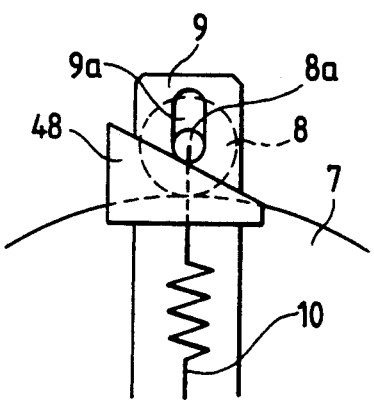
FIGS. 9A and 9B are views for explaining the operation in the vicinity of a subordinate roller.
Figure 9B:
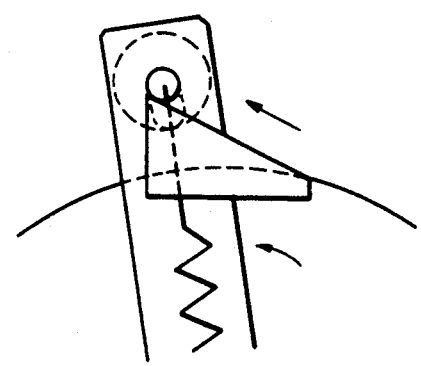

When the subordinate roller 8, together with the lever 9, is made to rotate around the driving roller 7 in a counterclockwise direction in the figure, the taper member 48 at the predetermined position and the shaft 8a are brought into abutment with each other, as shown in FIG. 9A. If a rotary driving force is given as it is, as shown in FIG. 9B, the shaft 8a rides up along the inclined plane of the taper member 48, with the result that the subordinate roller 8 is separated in a direction along the slit 9a. Conversely, it may be so arranged that the taper member 48 may be moved in a clockwise direction by means of a driving source (not shown) so as to separate the subordinate roller 8.

Various different arrangements may be conceivable for a mechanism for lifting up this subordinate roller. These arrangements will be explained later.

Referring back to FIG. 1, numeral 11 denotes a direction switching unit constructed in the same way as the above-mentioned direction switching unit 6. A driving roller 12 is driven by means of one motor 26 via a chain 28 together with the driving roller 7. Numerals 16, 17, and 18 denote fixed rollers which are rotatably supported, which guide a film so that the surface of the film will not rub against a guide plate during carrying. Numerals 19 to 22 denote guide plates which mainly form a straight-line and a low-curvature carrier path. The guide plate 19 has a shape curved in the direction of gravity. For the characteristics of the guide plate, one in which static electricity is unlikely to occur as a result of rubbing with a sheet is adopted. The surface of a guide plate is finished smoothly and frictional resistance is made small so that the surface of a film will not rub against the guide plate during carrying and the emulsion coating of the film surface will not be damaged. The surface of a guide plate is made into an emboss form in which oval-shaped, smooth projections are laid out regularly and an area in contact with a sheet S is small, thereby further exhibiting a large effect in reducing frictional resistance and static electricity.

A sheet inclination correction section 22a for correcting the inclination of a sheet and aligning the position, namely, registration, is disposed below the guide plate 22.

An automatic developer 25 can be connected to the side of the apparatus and recorded sheets are fed into a slit-like opening 24.

As shown in FIG. 2, a control circuit 120 capable of controlling the driving of all driving members, including motors 26 and 30, and a sub-scanning roller 2, is disposed on the roller unit and it controls on the basis of settings in a setting circuit 121.

The length of a carrier path from the sheet correction section 22a to the sub-scanning rollers 2 is set a little longer than the length of a sheet in the carrying direction and the length of the carrier path from the sub-scanning roller 2 to the end of the guide plate 19 is a little shorter than that of a sheet in the carrying direction. When the front end of the sheet taken out of the supply magazine 3 has reached the sub-scanning roller 2, the back end of the sheet remains in the supply magazine 3 and contacts with the stacked sheets. Hereinafter, the path along which a sheet taken out of the supply magazine 3 is fed to the guide plate 19 is called a first carrier path; the path from the bottom end of the guide plate 22 to the guide plate 19 is called a second carrier path. The first and second carrier paths share in common that portion of the path from the initial position of the subordinate roller 8 shown by a in FIG. 1 to the guide plate 19. Thus, a path consisting of the first and second carrier paths is disposed so as to substantially surround the supply magazine 3 and the receiving magazine 4 along both of their approximate outer circumferences. As a result, the entire apparatus is compact.

Next, the operation of this picture image recording apparatus will be explained with reference to FIGS. 3 to 8.

The supply magazine 3 in which unrecorded sheets are housed and stacked is mounted at a predetermined position inside the main body of the apparatus and a slide lid is opened while the inside of the apparatus is being shielded from light.

Figure 3:
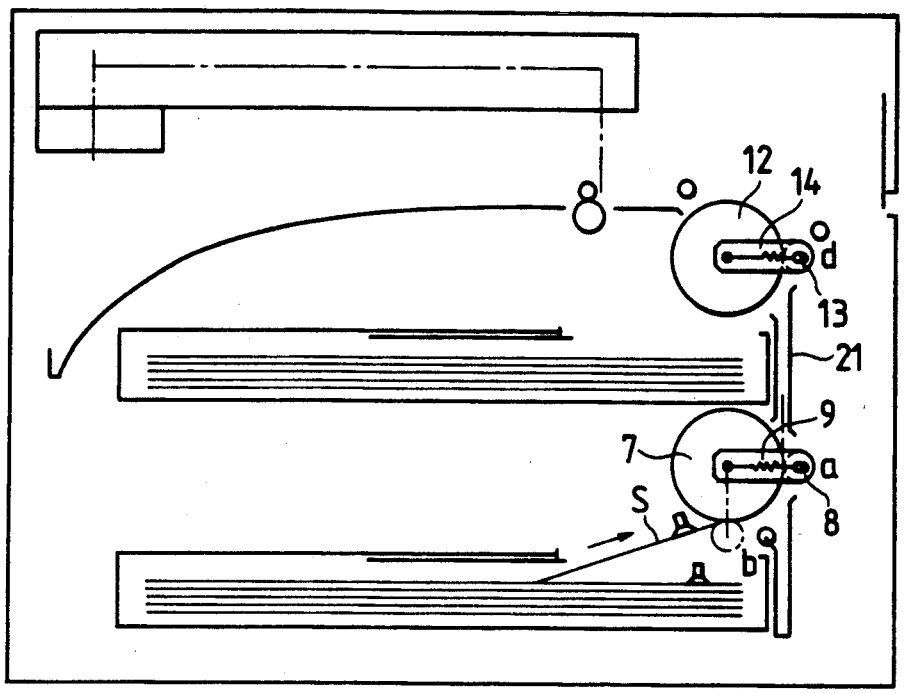
FIGS. 3 to 8 are views for explaining the operation of the embodiments.

Next, the suction cup 5 is actuated, and the topmost sheet of the sheets stacked in the supply magazine 3 is lifted up, as shown in FIG. 3. Next, the lever 9 is rotated approximately 90 degrees in a clockwise direction, causing the subordinate roller 8 to rotate from the initial position a to position b. Thus, the end section of a sheet lifted up by the suction cup 5 is grasped between the driving roller 7 and the subordinate roller 8. When the front end section of the topmost sheet is lifted in this manner, and if the driving roller 7 is rotated in a counterclock direction and at the same time the lever 9 is rotated at the same angular velocity, the driving roller 7 and the subordinate roller 8 rotate while the front end section of the sheet is being grasped between them and the direction in which the sheet is to be moved is changed to the upward direction. The rotation of the lever 9 is stopped when the subordinate roller 8 has returned to the initial position a and only the driving roller 7 continues to be driven. Then, the direction in which the sheet is moved is fixed to a vertical direction and the sheet is vertically, upwardly carried along the carrier path guided by means of a guide plate 21.

Figure 4:
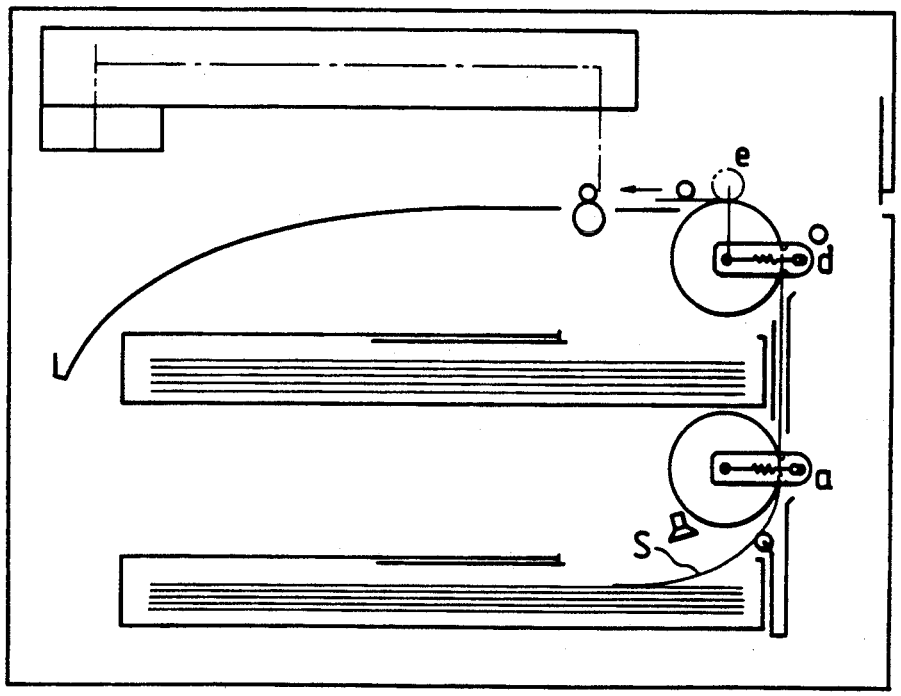
Figure 5:
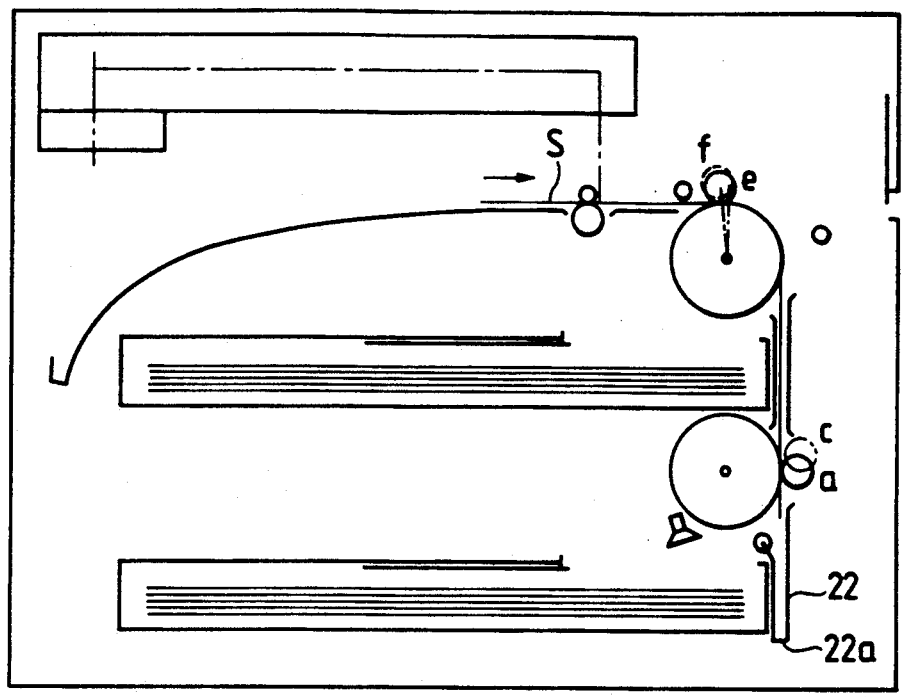

Next, the front end of the sheet reaches the direction switching unit 11 and is grasped between the driving roller 7 and the driving roller 12 which rotate at the same speed and in a counterclockwise direction, and the subordinate roller 13 stands by at position d. Next, the lever 14 is driven at the same angular velocity as that of the driving roller 12 and then the direction in which the sheet is to be moved is changed. When the subordinate roller 13 reaches position e, the lever 14 stops and the direction in which the front end of the sheet is to be moved is fixed to the left direction. The continuance of the rotation of the driving roller 12 causes the sheet to move along the carrier path in the left direction, as shown in FIG. 4.

The front end of the sheet carried along the first carrier path passes through the section between a pair of rollers of the rotating sub-scanning roller 2. The back end of the sheet is completely taken out of the supply magazine 3 and the sheet reaches the position, shown in FIG. 5, at which the back end of the sheet faces the vertical direction along the carrier path. Then, the sub-scanning roller 2 and the driving rollers 7 and 12 of the above-mentioned direction switching units 6 and 11 stop rotating, next the subordinate rollers 8 and 13 are withdrawn to positions c and f indicated by a dotted line, respectively, and release the grasped sheet. That is, only the driving force of the sub-scanning roller 2 is transmitted to the sheet.

At this point, the sub-scanning roller 2 starts to rotate in a reverse direction and the sheet begins to move in a reverse direction along the second carrier path. At this time, the back end of the sheet moves vertically and enters into the second carrier path guided by means of the guide plate 22. When the front end of the sheet finishes coming through the sub-scanning roller 2 that is reversely rotating, the sheet falls downward due to its own-weight and the back end of the sheet strikes the sheet correction section 22a at the lowest section of the guide plate 22. As a result, the back ends of the sheets are aligned. When a sheet taken out of a supply magazine is inclined to the carrying direction due to something which happens during the carrying process, this aligning of the back ends of the sheets makes it possible to correct the inclination and thus the positions of the sheets can be completely aligned.

Upon termination of registration in this manner, the driving roller 12 is rotated in a counterclockwise direction to return the subordinate roller 13 to the position e, and a sheet for which registration has been made is carried along the second carrier path in the direction of the recording position. When the front end of the sheet reaches the subscanning roller 2 that rotates for sub-scanning in a forward direction and the front end is grasped and held between the pair of rollers, at the same time the subordinate roller 13 is withdrawn to the position f and the driving roller 12 stops.

Figure 6:
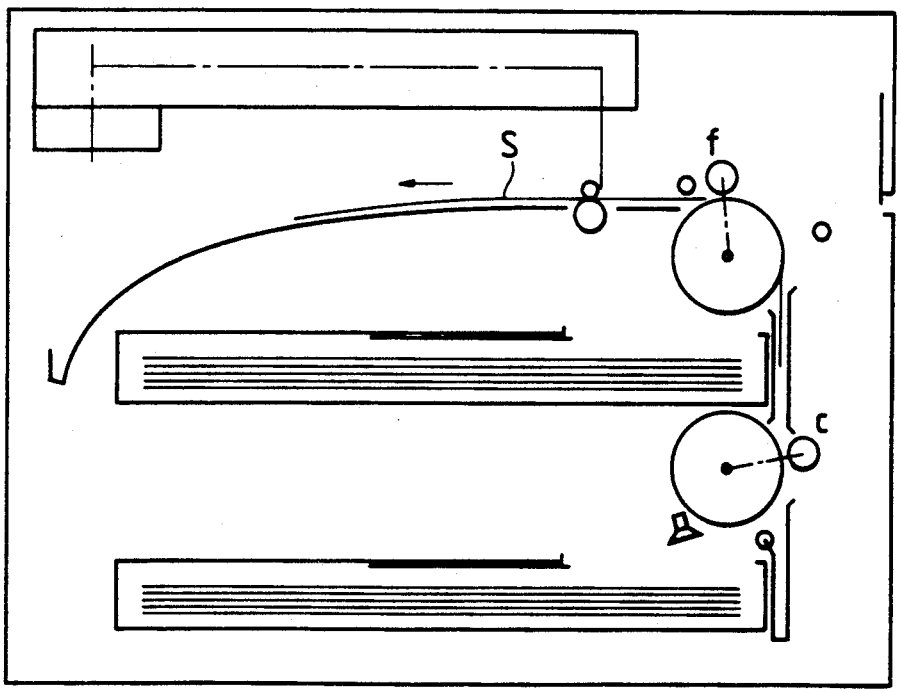
Figure 7:
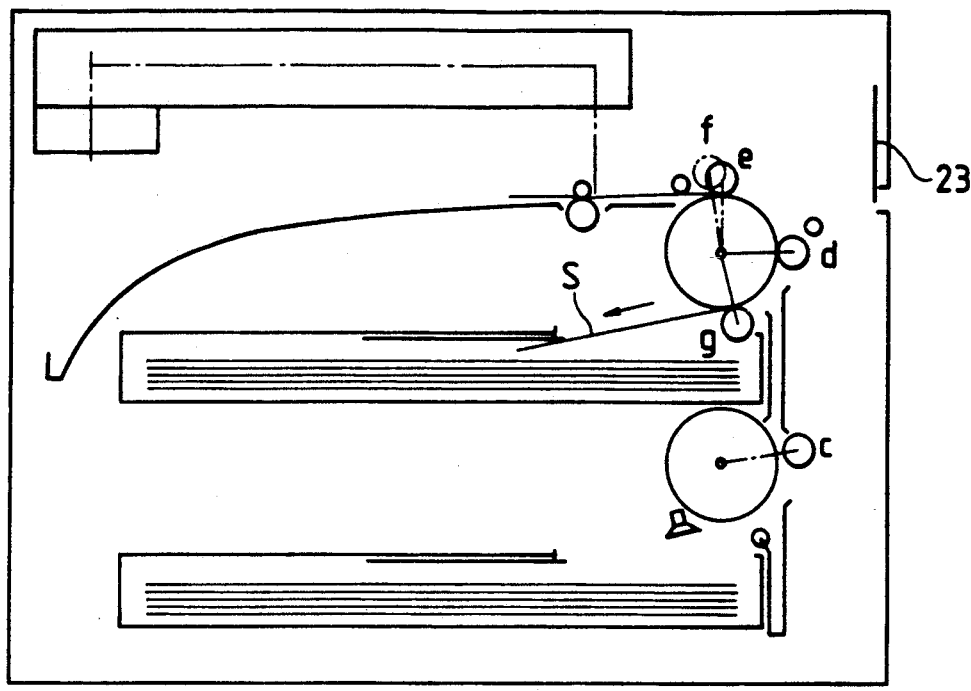
Figure 8:
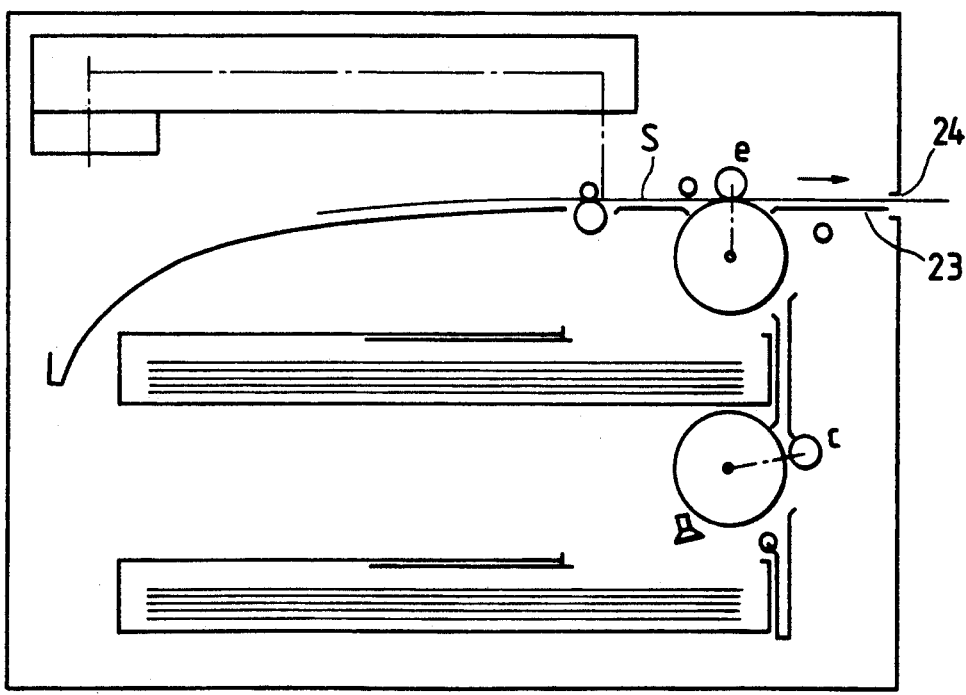

When subscanning of a sheet by the sub-scanning roller 2 is started, a shutter in the laser optical system 1 is opened and main scanning on a sheet is started with a laser beam. As shown in FIG. 6, latent images are recorded on the emulsion coating of the top surface of the sheet.

A sheet which is sub-scanned along the second carrier path is curved along the outer circumference of the driving roller 12. The curvature of the sheet resulting from the sheet being curved is a curvature close to a natural state in which the repulsion force of the bending of a flexible sheet and the suspending force of a sheet due to its own-weight cancel out each other. A force applied to the subordinate roller 13 and the guide plate 21 by the sheet is small.

Since the guide plate 19 is of a shape curved in the direction of gravity, carrying resistance between recorded sheets fed onto the guide plate 19 and the guide plate 19 is extremely small.

As set forth hereinabove, a sheet has no unnatural curvature in most sections of the second carrier path and is kept in a natural state. In addition, carrying resistances, such as frictional force and electrostatic force between the sheet and the guide plate, are very small.

Now the second carrier path will be compared with the first carrier path along which a sheet which has been taken out of the supply magazine 3 is carried. No large resistance due to static electricity or the like is produced as a result of the back end of a sheet being carried in close contact with stacked sheets stacked in the supply magazine 3 as in the first carrier path. Further, since frictional resistance between a guide plate and a roller caused by an elastic force by which a sheet is restored and variations in resistance are small, the carrying resistance of the second carrier path is much smaller than that of the first carrier path. As a result, subscanning can be performed at a stable feed speed with little variations, thereby making it possible to record high-quality images without the irregularity of quality.

Thus, when the recording of a picture image is terminated, the sub-scanning roller 2 is rotated in a reverse direction and recorded sheets are carried in a direction opposite to that at the time sheets are recorded. When the back end of the sheet has reached the driving roller 12, the withdrawn subordinate roller 13 is returned to the position e and the back end of the sheet is grasped. As the roller 12 rotates, the subordinate roller 13 is rotated at the same angle as that of the driving roller 12 so that the direction in which the sheet to be moved is changed. When the subordinate roller 13 has reached the position g in FIG. 7, the driving of the lever 14 is stopped to stop the subordinate roller 13. By making the driving roller 12 continue to be driven, recorded sheets are fed into the receiving magazine 4. When the driving roller 12 makes recorded sheets feed into the receive magazine 4 completely, the subordinate roller 13 returns to the initial position d.

The number of sheets which have already been housed in the receiving magazine 4 is detected by an unillustrated means. The height of the stacked sheets in the receiving magazine is estimated from the number and the stop position g of the lever 14 is determined according to the height. As a result, recorded sheets can be supplied to the receiving magazine without erroneous operations at any time irrespective of the number of the stacked sheets.

A control may also be made so as to vary the position of the subordinate roller 13 gradually from g to d while sheets are being supplied into the receiving magazine and to make the angle at which sheets enter the receiving magazine gradually larger.

Also, by changing the direction in which the recorded sheets are to be moved using the direction switching unit 11, they can be directly supplied to an automatic developer or the like disposed outside the picture image recording apparatus without housing recorded sheets in the receiving magazine. In this case, when the recording onto a sheet is finished, the variable guide plate 23 is put down flat and is moved to the position shown in FIG. 8. The subordinate roller 13 is fixed at the position e so that a sheet is moved straight in the right direction. By making the driving roller 12 continue to rotate in a clockwise direction, recorded sheets are ejected from an ejection port 24 and supplied to an automatic developer directly connected to the side.

In the embodiment described above, as a method of changing the direction in which sheets are to be moved by means of a direction switching unit, the course direction of the front end of the sheet is changed by making the subordinate roller start a rotary movement at the same angular velocity as the rotation of the driving roller if the front end of the sheet is grasped between the driving roller and the subordinate roller. As another method, the following procedure may be used. That is, when a sheet is grasped between a rotating driving roller and a subordinate roller, the driving roller is made to continue to be rotated with the subordinate roller left fixed so that the subordinate roller does not rotate and the sheet is fed a little in a straight direction. After this, in a state in which the rotation of the driving roller is continued or stopped, control is made in such a way that the subordinate roller is made to rotate to a desired position and the sheet which is fed a little is wound around the driving roller and the course direction of the sheet is changed. At this juncture, if the subordinate roller and the driving roller are simultaneously driven, it is desirable that the subordinate roller be driven at an angular velocity equal to or larger than that of the driving roller.

As another method, the direction in which a sheet is to be moved may be determined in such a way that the rotary movement of the subordinate roller is started at an angular velocity smaller than the rotary angular velocity of the driving roller if the front end of the sheet is grasped between the rotating driving roller and the subordinate roller and, after it is rotated to a desired position, the rotary movement of the subordinate roller is stopped.

Figure 10A:
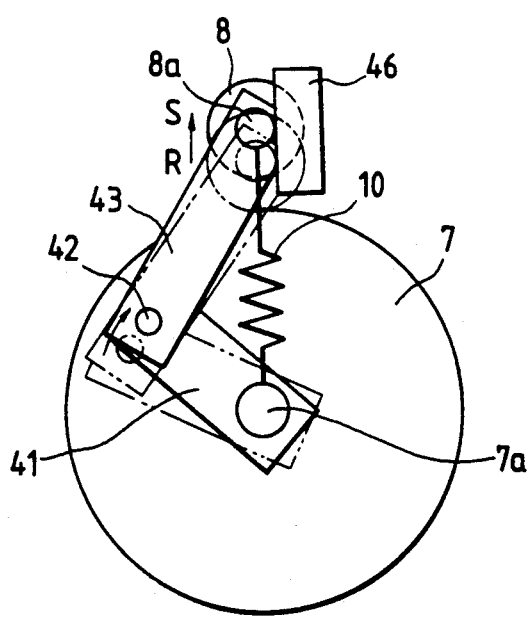
FIGS. 10A and 10B are views showing modifications of a roller unit.
Figure 10B:
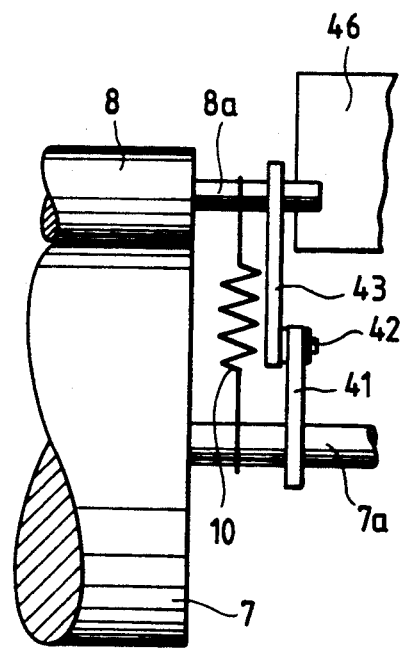

Next, another modification of the roller units 6 and 11 of the present invention will be explained. FIG. 10A is a front view of the roller unit. FIG. 10B is a side view of the roller unit.

In these figures, a lever 41 is fixedly mounted on the center axis 7a of planetary rotation in which the subordinate roller 8 rotates planetarily around the circumference of the driving roller 7. The center axis and the planetary rotation center axis of the driving roller 7 are the same. The driving roller 7 can be rotated in both the forward and reverse directions by the driving force transmitted by an unillustrated sprocket chain. The lever 41 and the lever 43 are connected to each other via a shaft 42 and can be pivoted freely. The shaft 8a of the subordinate roller is rotatably mounted on the lever 43. Numeral 10 denotes a tensile spring which provides a tensile force between the center shaft 7a and the shaft 8a of the subordinate roller 8, and the section between the two rollers is energized. Numeral 46 denotes a stopper member which is disposed at a predetermined position on the rotary path of the subordinate roller shaft 8a.

When the center shaft 7a is rotated in a clockwise direction in the figure, a force is applied so as to extend the lever 41 which is fixedly mounted on the center shaft 7a and the lever 43 which is pivotally connected. When the subordinate roller 8 rotates around the driving roller 7, generally, a triangle formed by the center shaft 7a, the shaft 42, and the subordinate roller shaft 8a as apexes, rotates around without changing its shape as a result of the tensile force of the spring 10. Therefore, since no member protruding from the outer circumference of the subordinate roller 8 exists, another member can be placed in the peripheral section and the entire apparatus can be made compact.

Next, when an additional rotary driving force is applied after the shaft 8a of the subordinate roller is brought into abutment with the stopper member 46 mounted on the rotary path, the shaft 8a of the subordinate roller moves so as to separate from the driving roller 7, along the abutment surface with the stopper member 46, in opposition with the tensile force of the spring 10. If the abutment surface with the stopper member 46 is set in a direction (vertical direction in this embodiment) intersecting the direction in which sheets are to be carried, it follows eventually that the shaft 8a separates from the driving roller 7 in a direction intersecting the direction in which sheets are to be carried.

Figure 11:
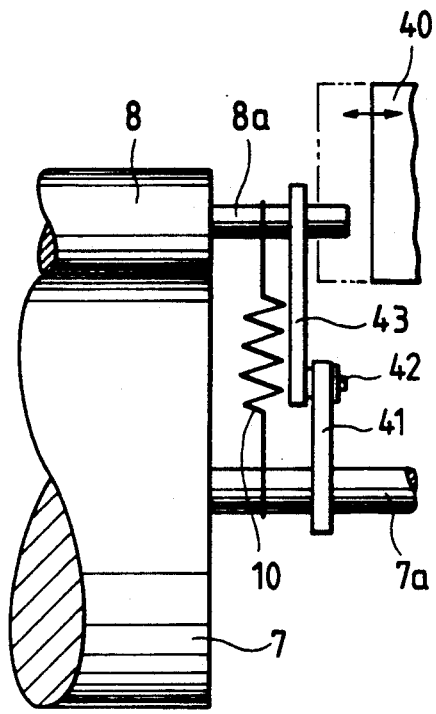
FIG. 11 is a view showing a modification of a stopper position.

In the above-mentioned embodiment, the stopper member 46 is fixedly mounted on the side plate. As a modification, as shown in FIG. 11, if the stopper member 46 is formed movably with respect to a predetermined position on the rotary path of the shaft 8a of the subordinate roller, the subordinate roller can be separated at a desired position among a plurality of predetermined positions.

In a case where a stopper member is fixedly mounted as in the above-mentioned embodiment, it is impossible for a subordinate roller which moves planetarily to move beyond a position at which a stopper is mounted. This poses no problem in a case where the direction in which sheets are to be carried is determined beforehand and a subordinate roller reciprocates at a fixed angle. When it is desired to grasp a sheet coming from an arbitrary direction and switch the direction in order to carry the sheet in another direction, the shaft 8a should preferably be formed rotatable around the driving roller 7 for 360 degrees. To achieve this, a plurality of stopper members 46 should be movably disposed on the rotary path of the subordinate roller 8 and a stopper member is made to enter at a position at which it is desired to separate the subordinate roller 8 from the driving roller 7.

Figure 12:
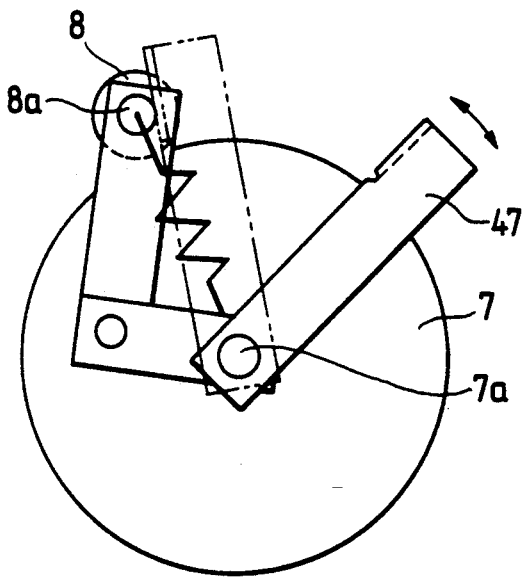
FIG. 12 is a view showing another modification of a roller unit.

In addition, as a modification having a large degree of freedom, as shown in FIG. 12, a subordinate roller can be separated at any position by mounting a stopper member 47 rotatably at the same axis as that of the driving roller 7 and by controlling the rotary movement of the stopper member 47 and the subordinate roller 8 independently of each other.

The stopper member 47 is rotatably mounted on the center shaft 7a of the same axis as that of the driving roller 7 and is provided with a rotary driving force by means of a specialized driving source like a motor. First, the stopper member 47 is moved in a rotary fashion independently of the others so that the subordinate roller 8 is stopped at a desired position. The stopper member 47 may be moved in a rotary fashion before the subordinate roller 8 is rotated, or the two members may be rotated simultaneously. In order not to block the movement of the subordinate roller 8 while the stopper member 47 is being moved in a rotary fashion as a result of it being contacted with the subordinate roller 8, the stopper member 47 is controlled so as to move in a rotary fashion in a direction opposite to the direction in which the subordinate roller 8 moves or to the front of the rotating subordinate roller 8. When the stopper member 47 reaches any position at which it is desired to separate the subordinate roller 8 and stops, then, the subordinate roller 8 reaches the same position. The subordinate roller 8 can be separated by the same action as before by providing the subordinate roller 8 with a driving force bringing it into abutment with the stopper member 47. In this way, the subordinate roller 8 can be separated at any position between 0 to 360 degrees.

Second Embodiment

Figure 13:
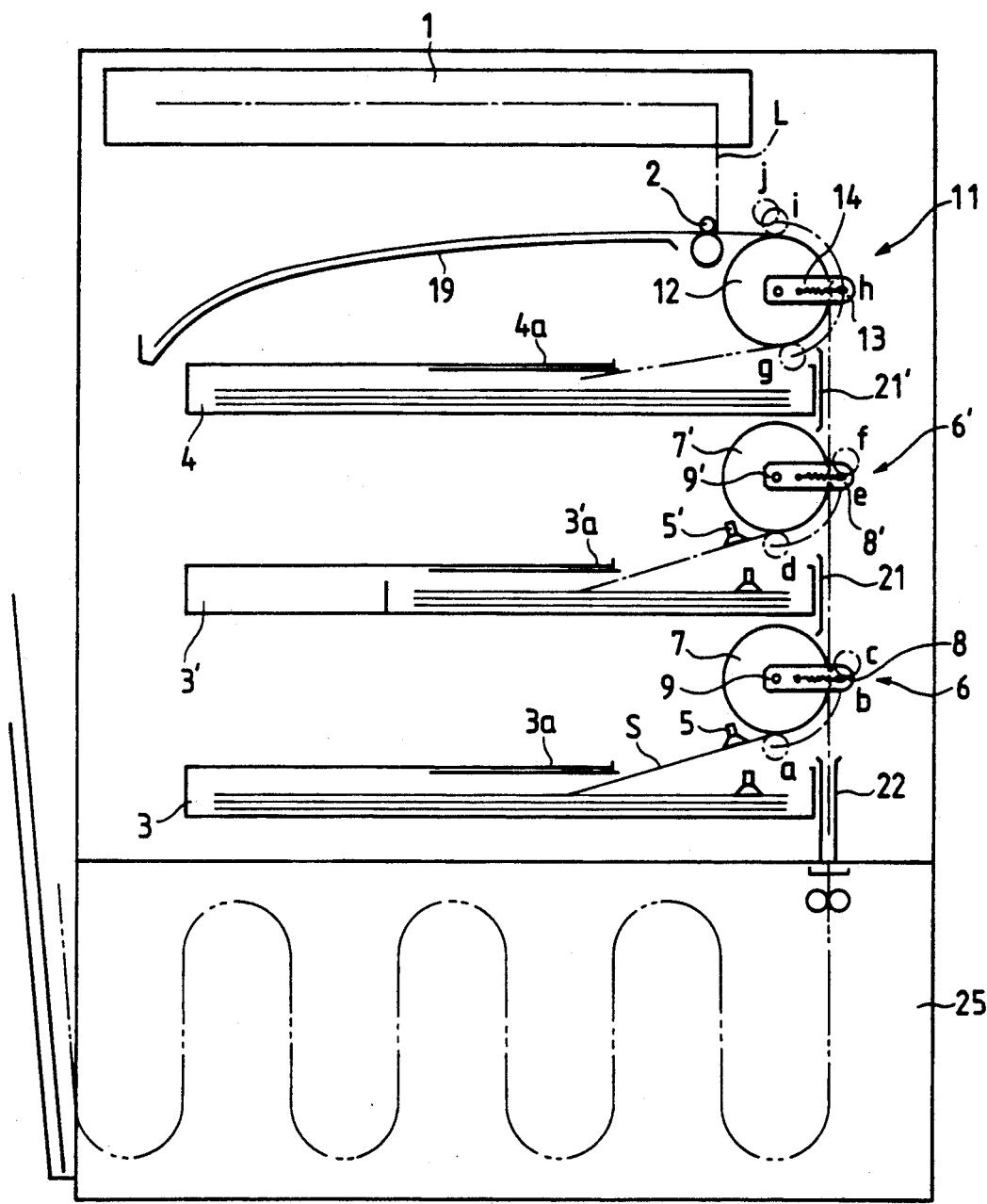
FIG. 13 is a view showing the construction of a second embodiment.

Next, an embodiment of the apparatus, in which the first embodiment shown in FIG. 1 is further improved and in which sheets of a plurality of sizes can be selectively used, will be explained with reference to FIG. 13. In FIG. 13, the same symbols and reference numerals as those used in FIG. 1 denote the same or identical members.

In FIG. 13, the sub-scanning roller 2 is placed below the laser optical system 1. Below the sub-scanning rollers 2 are placed in a parallel manner the supply magazine 3 for stacking and housing unrecorded sheets having a size of 14×17 inches (Hangiri size), a supply magazine 3' for stacking and housing unrecorded sheets S having a size of 11×14 inches (Dai-yotsugiri size) and a receiving magazine 4 for housing recorded sheets S, in order from the bottom. Slide lids 3a, 3'a, and 4a, which can be opened and closed to put in and take out sheets S, are disposed in the top surface of each of the magazines 3, 3', and 4, respectively. In the state in which the slide lids 3a, 3'a, and 4a are closed, the interiors of the magazines are shut off from the outside light. The film emulsion coatings of sheets S stacked inside all the magazines 3, 3', and 4 face downward so that the light shielding effect is further improved.

Suction cups 5 and 5' are disposed above the opening in the state in which the magazine lids 3a and 3'a of the supply magazines 3 and 3' are opened. The suction cups 5 and 5' are disposed to take out sheets S housed inside the supply magazines 3 and 3' one by one from the opening. The direction switching unit 6, for controlling the direction in which sheets are to be carried, has the same construction as the one explained in the above-mentioned first embodiment, and is disposed above the opening of the supply magazine 3. The subordinate roller 8 planetarily rotates around the driving roller 7 in accordance with the rotation of the lever 9. When the lever 9 is rotated and the subordinate roller 8 moves to position c from position a, the subordinate roller 8 is separated from the outer circumference of the driving roller 7.

Direction switching units 6' and 11 having the same construction as the direction switching unit 6 are disposed above each of the openings of the magazines 3' and 4, respectively. The driving rollers 7' and 12 of the respective units 6' and 11 are driven together with the driving roller 7 by means of the same motor via a chain. The subordinate roller 13 of the direction switching unit 11 can be rotated 180 degrees around the driving roller 12.

Guide plates 21, 21', and 19 constitute the sheet carrier path. These guide plates should form straight-line and low-curvature carrier paths. Care should be taken that the surface of a sheet S does not rub against a guide plate so the surface of the sheet will not be damaged. Numeral 23 denotes a guide plate for guiding recorded sheets S to an automatic developer 25.

In this apparatus, the distance from the sheet take-out slot of the respective supply magazines 3 and 3' to the picture image recording section is set at a distance equal to the distance in the direction in which sheets S housed in the magazines 3 and 3' are to be carried. That is, the distance from the exit of the supply magazine 3 to the sub-scanning roller 2 is approximately 430 mm, and the distance from the exit of the supply magazine 3' to the sub-scanning roller 2 is approximately 280 mm. Whichever sheet is used, when the front end of the sheet S reaches the sub-scanning roller 2, the back end of the sheet S has already been completely taken out of the supply magazine 3 or 3'. Therefore, the sheets S inside the magazines 3 and 3' will not rub against sheets S being recorded. Nor, will such a case occur in which the back end of the sheet S is brought into contact with the magazines 3 and 3' and the supply speed of sheets S during subscanning is disturbed, bringing about a decrease in picture quality. Also, it follows that the time required to record picture images need be only a minimum cycle of time regarding sheets S of various sizes.

Next, the operation of this picture image recording apparatus will be explained.

The supply magazines 3 and 3', in which unrecorded sheets S having different sizes are housed, are mounted at a predetermined position inside an apparatus main body, and the slide lids 3a and 3'a are opened in the state in which the inside of the apparatus is shut off from light.

When recording is performed on a sheet S of the Hangiri size, the suction cup 5 is actuated and the topmost sheet of the sheets S stacked in the supply magazine 3 is lifted. Next, by making the lever 9 rotate approximately 90 degrees in a clockwise direction to cause the subordinate roller 8 to rotate from the initial position b to the position a, the end section of the sheet S lifted by the suction cup 5 is grasped between the driving roller 7 and the subordinate roller 8. If the front end of the topmost sheet S is lifted in this manner, the driving roller 7 is rotated in a counterclockwise direction and at the same time the lever 9 is rotated at the same angular velocity. Then, the driving roller 7 and the subordinate roller 8 rotate with the front end of the sheet S being grasped between them and the direction in which the sheet S is to be moved is changed to the upward direction. When the subordinate roller 8 returns to the initial position b, the rotation of the lever 9 is stopped and only the driving roller 7 continues to be driven. Then, the course direction is fixed to a vertical direction and the sheet S is carried in a vertical, upward direction along the carrier path in which the sheet is guided by means of a guide plate 21. At this time, the subordinate roller 8' of the direction switching unit 6' has been withdrawn to the position f.

The front end of the sheet S reaches the direction switching unit 11 and is grasped between the driving roller 12 which rotates in a counterclockwise direction at the same angular velocity with that of the driving roller 7 and the subordinate roller 13 standing by at position h. Next, the lever 14 is likewise rotated at the same angular velocity as that of the driving roller 12 and the course direction of the sheet S is changed. When the subordinate roller 13 reaches position i, the lever 14 stops rotating and the course direction of the front end of the sheet S is fixed to the left direction. The continuance of the rotation of the driving roller 12 causes the sheet S to move in the left direction along the carrier path. When the front end of the carried sheet S has passed between a pair of the sub-scanning rollers 2 rotating at a fixed speed and the back end of the sheet S has completely left the supply magazine 3, the driving rollers 7, 7', and 12 of respective direction switching units 6, 6', and 11 stop rotating. Next, the subordinate roller 8 is withdrawn to the position a and releases the grasped sheet S. As a result, only the driving force of the sub-scanning roller 2 can be transmitted to the sheet S. The withdrawal of the subordinate roller 8 to the position a enables the holding of the back end of the sheet S to be released in a state in which the distance from the sheet take-out slot of the supply magazine 3 to the picture image recording section in the vicinity of the sub-scanning roller 2 is kept at a minimum.

When a high-accuracy subscanning is started by the subscanning roller 2 in the above way, the shutter inside the laser optical system 1 is opened; main scanning is started on the sheet S with a laser beam L; and latent picture images are recorded on the emulsion surface of the top surface of the sheet S.

When recording of the picture images is finished, the sub-scanning roller 2 is reversely rotated and the recorded sheets S are carried in a direction opposite to that during recording. When the back end of the sheet S reaches the driving roller 12 of the direction switching unit 11, the subordinate roller 13 which has been withdrawn is returned to the position i and the back end of the sheet S is grasped. The subordinate roller 13 is rotated at the same angular velocity as the rotation of the driving roller 12 and the course direction of the sheet S is changed. When the subordinate roller 13 reaches position g, the driving of the lever 14 is stopped to stop the subordinate roller 13. By continuing to rotate the driving roller 12 to rotate, recorded sheets S are fed into the receiving magazine 4 and the subordinate roller 13 returns to the initial position h.

On the other hand, when recording is performed on a sheet of the Dai-yotsugiri size, one sheet S inside the supply magazine 3' is taken out by using the suction cup 5' and the recording is made in completely the same way as the recording of the sheet S of the Hangiri size mentioned above. The sheet S is fed in the vertical, upward direction by using the direction switching unit 6'. After the sheet is sent to the sub-scanning roller 2 by means of the direction switching unit 11, the subordinate rollers 8' and 13 are withdrawn to the positions d and j, respectively, the sheet S is sent only by the sub-scanning roller 2, and recording of the picture images is performed.

As regards the recording of this sheet S of the Dai-yotsugiri size, when the front end of the sheet S reaches the sub-scanning roller 2, the back end of the sheet S has already left the receiving magazine 4 and is completely free. Hence, recording is performed in a minimum cycle of time without deteriorating the quality of a picture image.

Also, by making the course direction of the recorded sheet S change by using direction switching units 11, 6', and 6, the recorded sheet S can be supplied to the automatic developer 25 disposed in the picture image recording apparatus without housing recorded sheets S in the receiving magazine 4. In this case, the subordinate roller 13 grasping the back end of the recorded sheet S is rotated at the same angular velocity as the rotation of the driving roller 12 and stops at the position h. If the driving roller 12 continues to be driven, the direction in which the front end of the sheet S is to be moved is changed to the vertical, downward direction. At this time, the subordinate rollers 8 and 8' are made to stand by at positions f and c, respectively. When it is detected that the front end of the sheet S has passed between the driving roller 12 and the subordinate roller 13, by an unillustrated detection mechanism, the subordinate roller 8' moves to the position e and the direction switching unit 6' carries the sheet S in the downward direction. Similarly, when the front end of the sheet S has passed between the driving roller 7 and the subordinate roller 8, the subordinate roller 8 moves to the position b and the sheet S is carried downward. Further, when the front end of the sheet S is inserted into the guide plate 22, the shutter of the automatic developer 25 is opened. The sheet S enters the automatic developer 25 and is ejected onto a tray which is fixed on the side of the apparatus after passing through processes such as development, fixation, drying and so forth.

Third Embodiment

Figure 14:
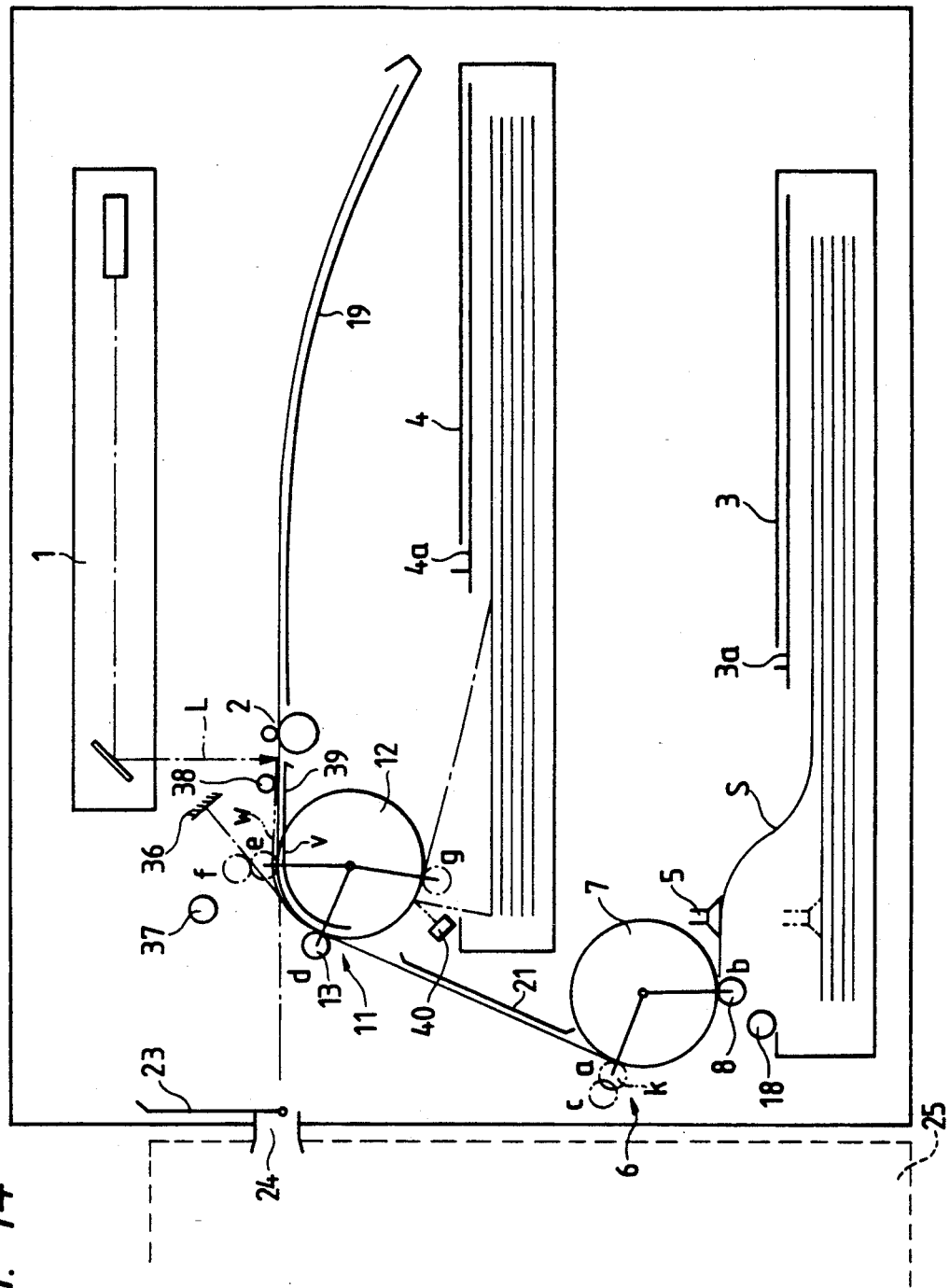
FIG. 14 is a view showing the construction of a third embodiment.

FIG. 14 shows the construction of a further embodiment of the present invention. This embodiment is characterized in that registration is made at the front end of an advancing sheet. In FIG. 14, the same symbols and reference numerals as those used in the above-mentioned embodiments denote the same or identical members.

The supply magazine 3 and the receiving magazine 4 are placed in parallel and slightly apart from each other in the forward and backward directions below the sub-scanning roller 2, in order from the bottom.

Numeral 39 denotes a movable guide plate, whose surface is machined smoothly and which has a frictional resistance smaller than that on the surface of the driving roller 12. The movable guide plate 39 is mounted so as to be vertically movable between positions V and W. The movement between the positions V and W is synchronized with the movement of the subordinate roller 13 between positions e and f. The position V is withdrawn from the carrier path, and a sheet can be carried when the driving roller 12 is driven with the sheet and the driving roller 12 being in contact with each other. Meanwhile, the position W is within the carrier path, and the sheet lifted by the movable guide plate 39 is out of contact with the driving roller 12, with the result that carrier resistance is smaller.

Numeral 36 denotes a sheet correction member for correcting the inclination of a sheet and registration. The abutment surface in abutment with the front end of a sheet is placed in parallel to the main scanning lines of a laser beam. The correction member 36 is positioned to the right of and above the direction switching unit 11. When the subordinate roller 8 lies at position a, the length of the sheet carrier path from the contact point between the subordinate roller 8 and the driving roller 7 to the correction member 36 is set to a length shorter than that of the sheet in the carrying direction. As a result, compactness in the apparatus is achieved.

Next, the operation of a picture image recording apparatus constructed as explained above will be explained.

The topmost sheet of the sheets stacked in the supply magazine 3 is lifted by the suction cup 5 and the front end of the sheet is inserted between the driving roller 7 of the direction switching unit 6 and the subordinate roller 8 standing by at position b. Then, the suction of the suction cup 5 is released and the force holding the sheet is nullified. The driving roller 7 is driven by an unillustrated driving source, and at the same time the subordinate roller 8 moves in a rotary fashion at the same angular velocity in a clockwise direction in the figure. These rollers rotate with the front end of the sheet being grasped between them and the direction in which the front end of the sheet is to be moved is changed to the upward direction. When the subordinate roller 8 reaches position a, it stops the rotary movement. After this, only the driving roller 7 continues to be driven so as to rotate, causing the subordinate roller 8 to rotate subordinately, and the sheet is caused to move in the upward direction along the guide plate 21. When the front end of the carried sheet is inserted between the driving roller 12 of the direction switching unit 11 and the subordinate roller 13 standing by at position d, the subordinate roller 13 rotates around the driving roller 12, with the sheet grasped between them at the same angular velocity as that of the sheet carrying speed up to position e, and the direction in which the sheet is to be moved is once turned to the right direction. Next, when the subordinate roller 13 is withdrawn to position f from position e, the front end of the sheet curved due to the fact that it is held by the subordinate roller 13 is turned to the direction of the correction member 36 by the bending repulsion force. When the sheet is carried in the upward direction by the driving roller 7 in this state, the front end of the sheet is brought into abutment with the correction member 36 with the result that the inclination of the sheet is corrected and the sheet is positioned accurately so that it lies parallel to the direction of main scanning. At this time, if it is supposed that the sheet supplied is inclined and the entire side of the front end of the sheet is brought into abutment with the correction member 36, the sheet is twisted. However, this twist is absorbed by a weak portion of the sheet indicated by the two-dot-and-chain line in the figure.

After the inclination of the sheet is corrected in this manner, when the subordinate roller 13 which has been withdrawn to position f is returned to position e, the front end of the sheet is turned to the direction of the sub-scanning roller pair 2 and is grasped between the driving roller 12 and the subordinate roller 13. Next, when the subordinate roller 8 is moved to position c from position a, the back end of the sheet is released and the twist of the sheet is eliminated.

Next, when the driving roller 12 is rotated forward, the sheet advances along the guide plate 39 and moves in the direction parallel to the sub-scanning roller 2. The sheet is carried until the back end of the sheet leaves the guide roller 18 and is completely out of the supply magazine 3. When the back end of the sheet leaves the guide roller 18 and is out of the supply magazine 3, if the front end of the sheet is carried beyond the sub-scanning roller 2, the driving roller 12 of the direction switching unit 11 is rotated in a direction (counterclockwise in the figure), that is, reverse to that up to the present time.

At the time the front end of the sheet reaches a laser recording position, the driving roller 12 and the sub-scanning roller 2 are rotated again at the same carrying speed in the forward rotating direction. When the front end of the sheet reaches the sub-scanning roller 2 that rotates for subscanning in the forward direction and the front end is grasped and held between the sub-scanning rollers 2, at that time the subordinate roller 13 is separated from the driving roller 12 and is withdrawn to the position f, and the driving roller 12 stops rotating. At the same time, the movable guide plate 39 which has been withdrawn to position v is lifted up and moves to position w, causing the sheet to be separated from the surface of the driving roller 12. The movable guide plate 39 acts as a carrying guide during subscanning. A material of the movable guide plate 39 in which a static electricity charge is difficult to induce is adopted. The surface of the material is smoothed or embossed, with the result that frictional resistance is extremely low.

Figure 15:
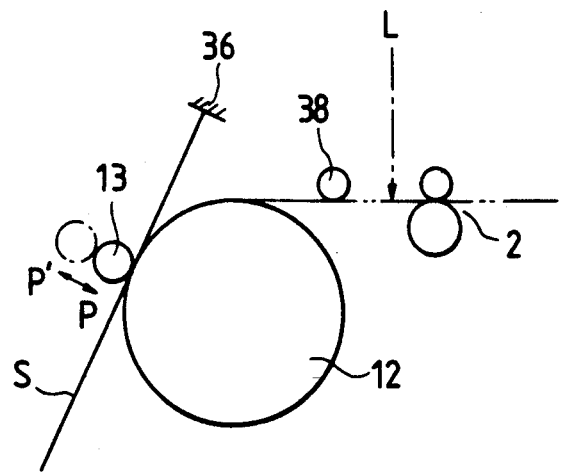
FIG. 15 is a view for explaining the operation of the modification of the third embodiment.

In the above-mentioned embodiment, before a sheet is corrected, the subordinate roller 13, which grasps the sheet between it and the driving roller 12, moves from position P through position Q to position R, and the front end of the sheet is released. Then a correction operation is performed. However: as shown in FIG. 15, the correction of the inclination of a sheet may be performed in such a way that the sheet continues to be carried, with the subordinate roller being fixed at position P and the sheet brought into abutment with the correction member 36 positioned on a tangent line ahead of it. In this case, the subordinate roller 13 separates from the position P and moves to position P'. Next, the sheet is lifted from behind in a procedure similar to the one used with the above-mentioned embodiment, and the inclination of the sheet is corrected. After the correction of the inclination is finished, the subordinate roller 13 is pressed against the driving roller 12 to grasp the sheet between them, and the sheet is moved to the next recording process.

As has been explained above, according to the present invention, since the inclination of a sheet is corrected in the end section of the sheet in the direction in which the sheet is to be moved, when the sheet is longer than the distance from a correction member to a pair of rollers with which the sheet is brought into abutment, various sizes of sheet can be used.

Next, as a modification in which the roller unit of the present invention is used in a mechanism for taking out sheets from a magazine, several examples which are so designed as to be capable of reliably grasping and carrying sheets which have been taken out will be shown below.

Figure 16:
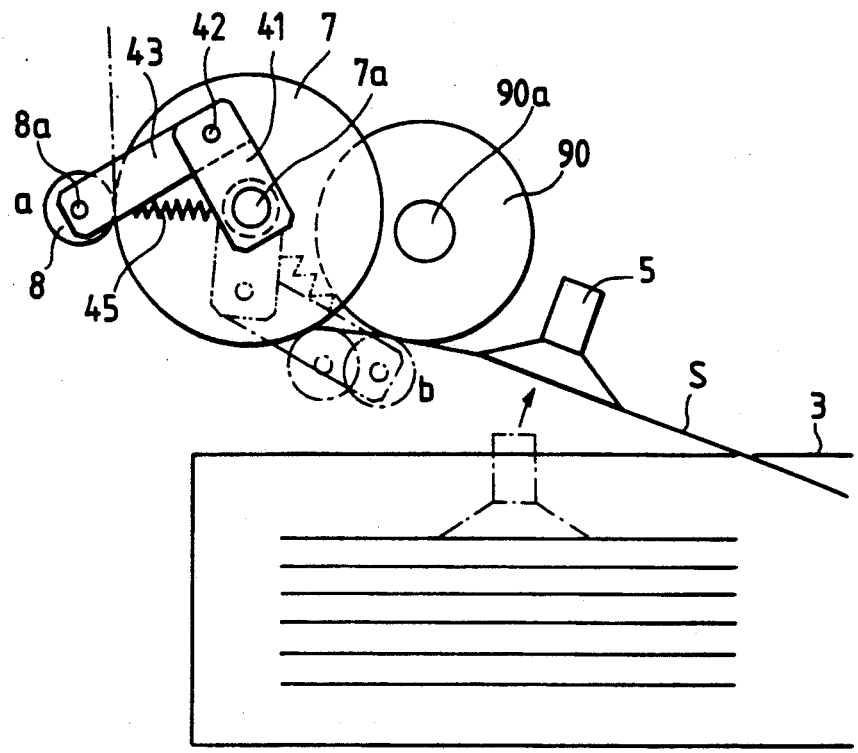
FIGS. 16 to 19 are views showing examples in which a sheet take-out mechanism is improved.

In FIG. 16, the first driving roller 7 and a second driving roller 90 are disposed above the supply magazine 3. The first driving roller 7 and the second driving roller 90 are mounted on the shaft 7a and a shaft 90a, respectively. A driving force is transmitted to the first driving roller 7 and the second driving roller 90 by an unillustrated chain sprocket motor. The number of teeth is determined so that the rotary speed of the first driving roller 7 equals that of the second driving roller 90. In addition, the rotary shafts 7a and 90a are respectively disposed on the teeth fly of the first driving roller 7 and the second driving roller 90. The positional relationship between them is such that the roller of a partner enters into the clearance.. The lever 41 is rotatably mounted on the shaft 7a. The lever 43 is flexibly connected to the front end of the lever 41 via the shaft 41. The subordinate roller 8 is rotatably mounted on the front end of the lever 43 via the shaft 8a. The shaft 7a is the planetary rotation center axis such that the subordinate roller 8 planetarily rotates around the circumference of the first driving roller 7. A tensile spring 45 is disposed between the front end of the lever 43 and the shaft 7a, which energizes the subordinate roller 8 in the direction parallel to the shaft 7a.

Next, the operation of the apparatus will be explained. In a state in which the slide lid of the supply magazine 3 is open, the suction cup 5 is actuated, and the topmost sheet of the sheets stacked inside the supply magazine is lifted by suction. The front end of the lifted sheet S is brought into abutment with the second driving roller 90 or is stopped once in the vicinity of the roller 90. Next, the subordinate roller 8 which lies on position a is rotated and moved in a counterclockwise direction. When the subordinate roller 8 rotates around the driving roller 7, the subordinate roller 8 is rotated in a state in which a triangle formed by the center shaft 7a, the shaft 42, and the subordinate roller 8 as apexes is maintained by the tensile force of the spring 45. In due time, the subordinate roller 8, grasping the front end of the sheet S, is brought into abutment with the second driving roller 90. At this time, even if the front end of the sheet S is separated from the second driving roller 90 due to curling or the like, since the subordinate roller 8 approaches the sheet S substantially from below, it is possible to reliably grasp the sheet S between itself and the second driving roller 90. Next, the subordinate roller 8 moves along the periphery of the second driving roller 90 in opposition to the tensile spring 45, thereby changing the above-mentioned triangle, and reaches position b. At this point, when the first driving roller 7 and the second driving roller 90 are rotated at the same speed in a clockwise direction, the grasped sheet S starts to move to the front. At the same time, when the subordinate roller 8 is moved planetarily at the same speed as the rotary speeds of the first driving roller 7 and the second driving roller 90, the subordinate roller 8 continues to move in a rotary fashion after it has moved over to the first driving roller 7 and stops moving when the front end of the sheet S is turned to a desired direction. Further, if the driving rollers 7 and 90 are made to continue to rotate, it follows that the sheet S will be carried in the desired upward direction.

In the above-mentioned example of FIG. 16, the example in which the subordinate roller 8 moves across the driving rollers 7 and 90 is shown assuming that the first driving roller 7 and the second driving roller 90 are in such a positional relationship that they enter into each other. As another modification, an example shown in FIG. 17 can be cited.

Figure 17:
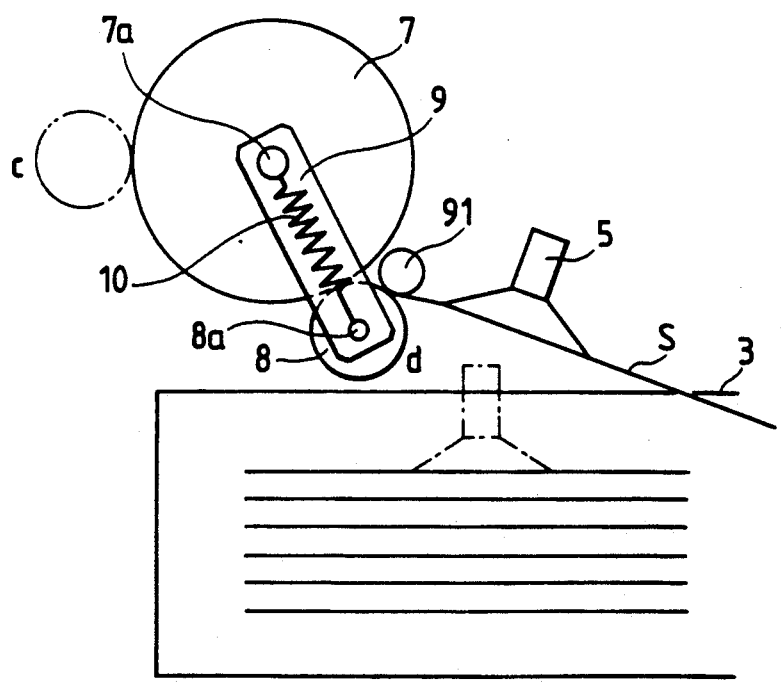

In FIG. 17, the driving roller 7 and the subordinate roller 8 are connected to each other by the lever 9. The shaft 8a is energized by the tensile spring 10 along a slit provided on the lever 22. A rotary roller 91 having no rotary driving force which is rotatably mounted is disposed between the suction cup 5 and the driving roller 7. The rotary roller 91 is disposed at a position at which it abuts with the subordinate roller 8 when the subordinate roller 8 rotates around the circumference of the driving roller 7.

In this embodiment, also, as in the above-mentioned example in FIG. 16, the sheet S is taken out of the supply magazine 3 with the suction cup 5, and the sheet S is lifted to a position at which the front end of the sheet S is brought into abutment with the rotary roller 91 or in the vicinity of that position. Next, the subordinate roller 8 standing by at position c at first begins to move in a counterclockwise direction and in due time it grasps the sheet S as the result of the front end of the sheet S being brought into abutment with the rotary roller 91. At this time, for the same reason as in the above-mentioned embodiment, the front end of the sheet can be reliably grasped between the subordinate roller 8 and the rotary roller 91. Next, when the driving roller 7 is rotated in a clockwise direction, the driving force is transmitted to the rotary roller 91 via the subordinate roller 8 and the carrying of the sheet S is started. When the front end of the sheet S is inserted between the subordinate roller 8 and the driving roller 7, the subordinate roller 8 begins to move in a rotary fashion at the same speed as the rotary speed of the driving roller 7 and carries the sheet S while the direction of the sheet S is switched. At the time the front end of the sheet S is turned to a desired direction, the rotation of the lever 22 is stopped and then the sheet S is fed in a desired direction. The rotary roller 91 may be formed by a fixed sheet guide member like a guide plate.

Figure 18:
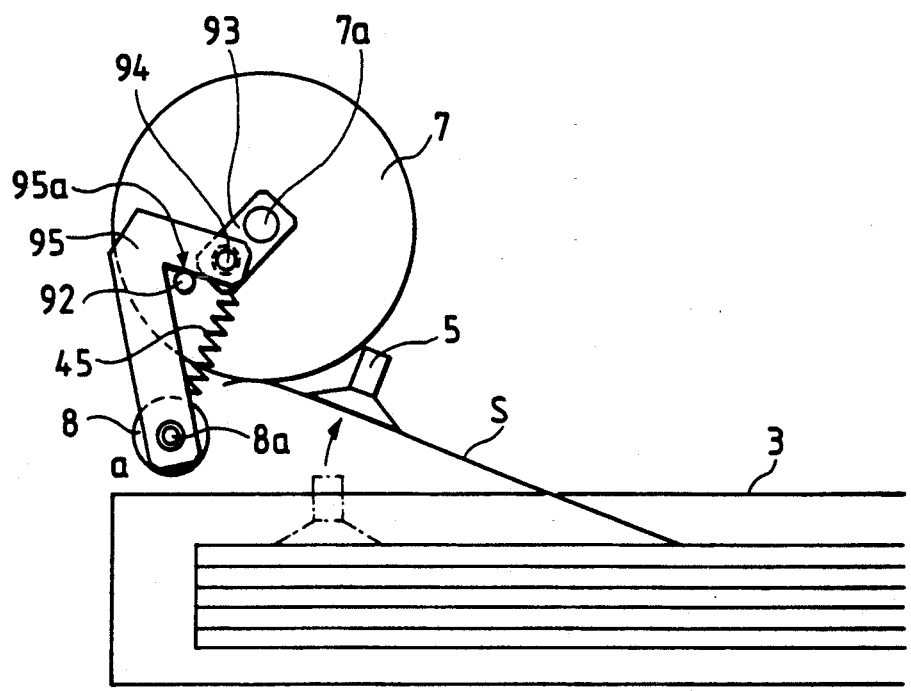
Figure 19:
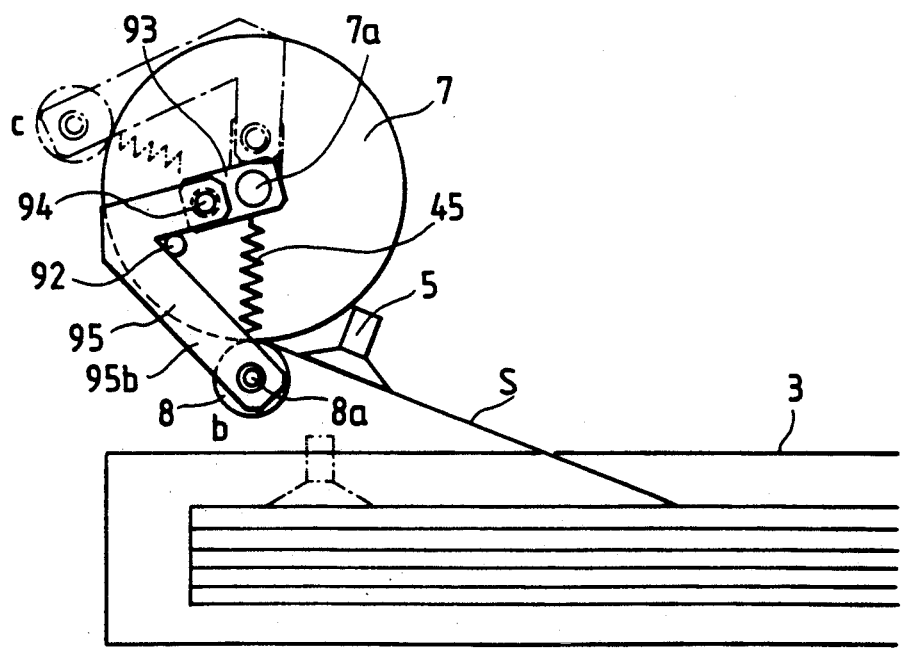

FIGS. 18 and 19 show the construction of a further modification. In these figures, the subordinate roller 8 is supported by a lever 92 flexibly connected via a shaft 94 and a substantially L-shaped lever 95. The subordinate roller 8 is rotatably supported by the shaft 8a disposed at the front end of the substantially L-shaped lever 95. The tensile spring 45 is hooked across between the shaft 8a and the planetary rotation center axis 7a. Numeral 92 denotes a regulation shaft provided on the side plate (not shown), which is positioned on the orbit of the short side 95a of the substantially L-shaped lever 95 which rotates together with the subordinate roller 8.

Next, the operation will be explained. At first, the subordinate roller 8 lies at position c shown in FIG. 19. When the lever 93 is rotated in a counterclockwise direction, the driving is transmitted to the subordinate roller 8 via the substantially L-shaped lever 95 and the subordinate roller 8 begins to move in a rotary fashion with respect to the driving roller 7. When the subordinate roller 8 rotates around the driving roller 7, the subordinate roller 8 rotates maintaining the triangle formed by the lever 93, the lever 95, and the tensile spring 45 as the three sides by means of the tensile force of the tensile spring 45. When the subordinate roller 8 reaches position b, the short side 95a of the substantially L-shaped lever 95 is brought into abutment with the regulation shaft 92. When the lever 93 is further rotated in a counterclockwise direction, the substantially L-shaped lever 95 begins to move in a rotary fashion while slightly sliding with the regulation shaft 92 as a fulcrum. The subordinate roller 8 is separated from the driving roller 7 as the result of this rotary movement and begins to move in a direction substantially backward with respect to the direction in which the subordinate roller 8 has been rotating around the circumference of the driving roller 7. At the time the subordinate roller 8 reaches position a in FIG. 18, the rotation of the lever 93 is stopped.

Next, the suction cup 5 is actuated to suck and lift the sheet S from the supply magazine 3. The front end of the lifted sheet S is brought into abutment with the driving roller 7 or is positioned in the vicinity of the driving roller 7, the state of which is shown in FIG. 18. At this point, when the lever 93 is rotated in a clockwise direction, the subordinate roller 14 begins to move in the direction parallel to the driving roller 7 reversely from before. Even if the front end of the sheet S is separated from the driving roller 7, since the subordinate roller 8 approaches the sheet S from substantially below, the sheet S can reliably be grasped between the subordinate roller 8 and the driving roller 7. Next, the suction by the suction cup 5 is stopped and the driving roller 7 is rotated in a clockwise direction. Then, the grasped sheet S begins to move to the front along the driving roller 7. At the same time, when the subordinate roller 8 is moved at a speed equal to the rotary speed of the driving roller 7, the subordinate roller 8 carries the sheet S with the front end of the sheet S being grasped while the direction of the sheet S is switched. When the front end of the sheet S is turned to a desired direction, for example, a direction parallel to the picture image recording section or another carrying roller pair, the subordinate roller 8 stops moving and then rotates, together with the driving roller 7, causing the sheet S to feed to the desired direction.

In this embodiment, the subordinate roller 8 is separated from the driving roller 7 in a backward direction by bringing it into abutment with the regulation shaft 92. However, other driving sources and levers may be used to separate it in a backward direction. For example, in FIG. 19, an unillustrated lever, which has been withdrawn to the right side with respect to the lever 95, is moved to the left by means of a driving means like a solenoid. At this time, if the front end of this lever is bent or a dowel is disposed, it can move to the left while the long side 95b of the lever 95 is being hooked during movement. As a result, the lever 95 swivels with the shaft 94 as the rotation center, and the subordinate roller 8 moves to the position a from position b, eventually permitting the subordinate roller 8 to separate from the driving roller 7 in a backward direction.

Next, several modifications of roller units used in the embodiments which have been explained above will be described below.

Figure 20:
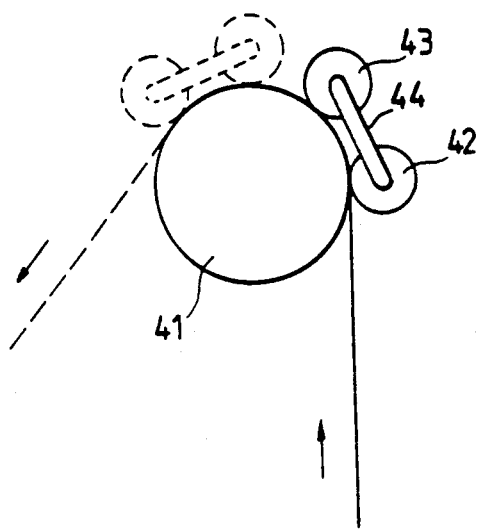
FIGS. 20 and 21 are views showing modifications of a roller unit.

In FIG. 20, as a planetary member which planetarily rotates around the driving roller 41, a member in which two rollers 42 and 43 are connected to each other by a connecting bar 44 is used. Both of the rollers 42 and 43 are energized to the outer circumference of the driving roller 41. Since a sheet is grasped at two places in comparison with the case of one subordinate roller, more stabilized carrying is made possible.

Figure 21:
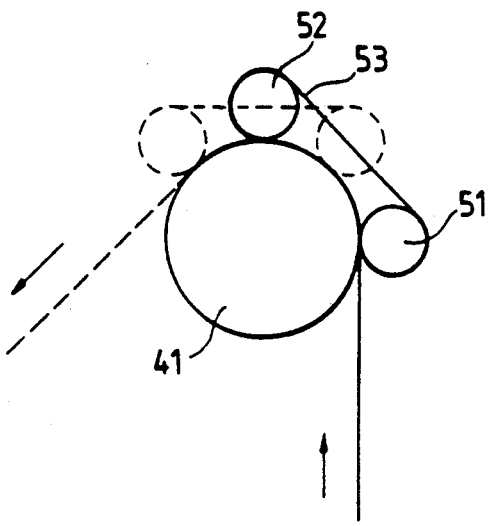

Also, as shown in FIG. 21, a planetary member may be formed by an arrangement in which a rubber belt 53 is stretched between two rollers 51 and 52 so that the sheet holding force is further increased.

Figure 22:
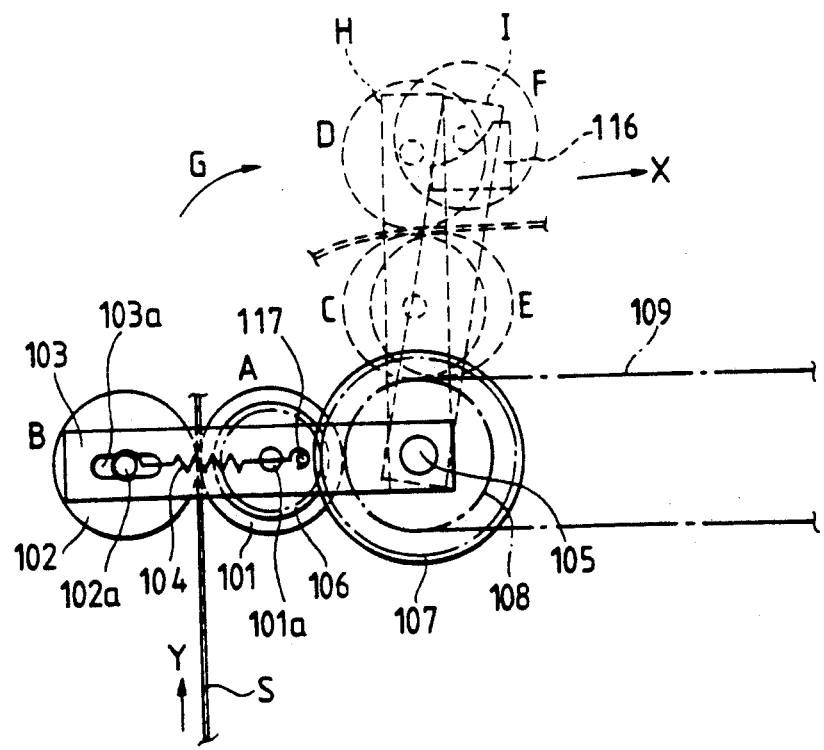
FIGS. 22 and 23 are views showing other modifications of a roller unit.
Figure 23:
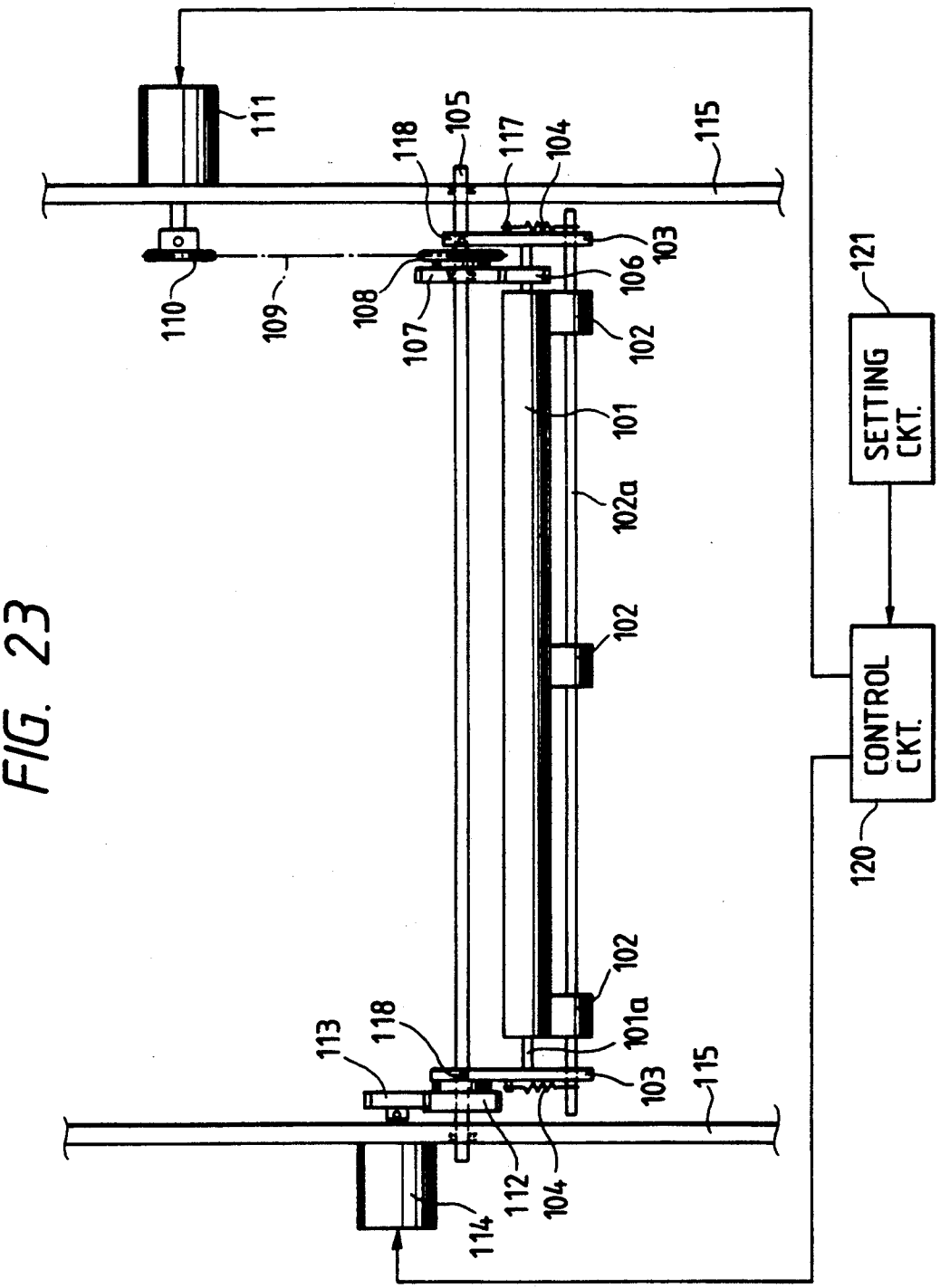
Figure 25:
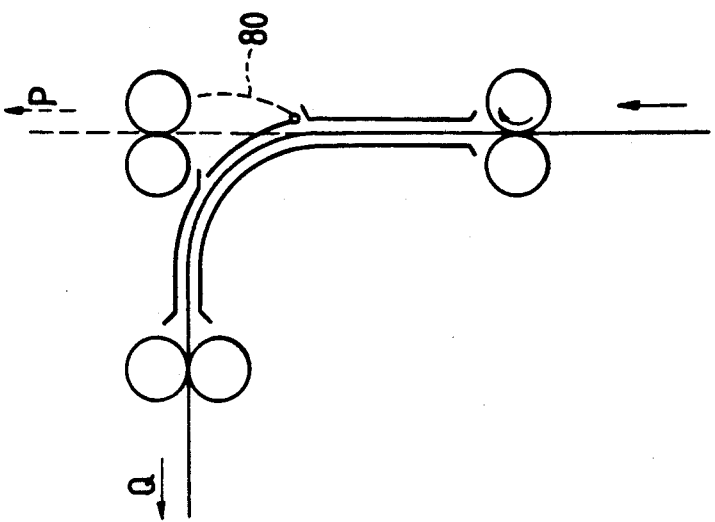
FIGS. 24 and 25 are views showing examples of the prior art.
Figure 24:
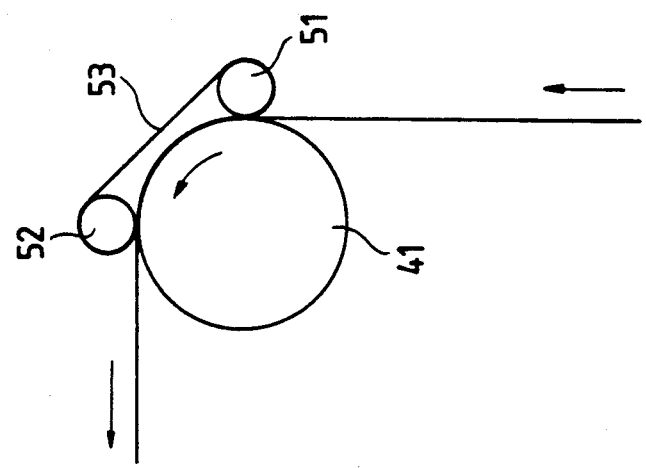

Next, a still further modification will be explained with reference to FIGS. 22 and 23. In these figures, numeral 101 denotes a driving roller, which is rotatably held by a pair of levers 103 arranged at both ends of driving roller 101 via a shaft 101a. Numeral 102 denotes a subordinate roller with three small rollers uniformly placed and connected to the shaft 102a. Each end of the shaft 102a passes through the respective slit 103a of the two levers 103. One end of a tensile spring 104 is hooked to the shaft end and the other end of the tensile spring 104 is fixed to the lever 103 via a pin 117. Hence, the subordinate roller 102 is biased in a direction of to the driving roller 101 by the tensile force of the tensile spring 104. The lever 103 is securely connected to a shaft 105 by a pin 118. The shaft 105 is rotatably held on a frame 115. A gear 112 is fixed to one of the levers 103 and the gear 112 is engaged with a gear 113 mounted on the shaft of a lever driving motor 114 fixed to the frame 115. As a result, the driving force of the lever driving motor 114 enables the driving roller 101 and the subordinate roller 102, which are held by the lever 103 with the shaft 105 as the rotation center via the gears 113 and 112, to be turned as in one piece.

On the other hand, a gear 106 is fixed to a driving roller shaft 101a. The gear 106 is engaged with a gear 107 which is rotatable about the shaft 105. A sprocket 108 is fixed to a gear 107 on the same shaft. Numeral 111 denotes a roller driving motor fixed to the frame 15 and a sprocket 110 is fixed to the roller driving motor. The two sprockets 108 and 110 are connected to each other by a chain 109. Therefore, the driving force of the roller driving motor 111 is transmitted to the driving roller 101 via the sprocket 110, the chain 109, the sprocket 108, the gear 107 and the gear 106 in that order, causing the driving roller 101 to be driven to rotate. In this way, a sheet grasped between the driving roller 101 and the subordinate roller 102 driven by the driving roller 101 can be carried.

The driving roller 101 and the subordinate roller 102 lie at positions A and B in the figure in the initial state. At this time, the lever driving motor 114 stops and the roller driving motor 111 rotates, causing the driving roller 101 to rotate in a clockwise direction. Together with this, the subordinate roller 102 rotates subordinately. At this point, when the sheet S is inserted between the driving roller 101 and the subordinate roller 102 in the Y direction in the figure by an unillustrated mechahism, the sheet S is grasped between the two rollers and it is carried in the Y direction by the driving force of the driving roller 101. When the front end of the sheet S is carried a little and reaches the position indicated in FIG. 22, the lever driving motor 114 begins to rotate and drives so as to cause the lever 103 to rotate in the G direction. At the same time, the speed of the roller driving motor 111 is changed to a number of rotations corresponding to the rotary angular velocity of the lever 103. Thus, the driving roller 101 enters a stopped state relative to the lever 103. In a state in which the distance from the contact point of the driving roller 101 to the front end of the sheet S does not vary, the direction in which the sheet is to be moved is changed.

Next, when the lever 103 reaches position H in the figure, the lever driving motor 114 stops. At the same time the speed of the roller driving motor 111 is changed so as to carry a sheet at a predetermined speed. The lever 103 moves again in the same direction. When it reaches position I and stops, a plate cam 116 fixed to a frame and the subordinate roller shaft 102 are brought into contact with each other, the subordinate roller 102 is lifted, the driving roller 101 is separated from the subordinate roller 102, and the sheet binding force between the two rollers is released.

The direction of the sheet S entered from the Y direction in the above way is changed to the X direction and the sheet is carried.

Many widely different embodiments of the present invention can be made without departing from the spirit and scope thereof. Therefore, it is to be understood that this invention is not limited to the specific embodiments thereof except as defined in the appended claims.

What is claimed is:

1. A sheet carrier apparatus, comprising:
   a first and a second rotary members, at least one of said rotary members having a rotary driving force by first dirving means and capable of carrying a sheet grasped between the rotary members, said second reotary member being rotatable around said first rotary member by second driving means; and
   control means for carrying a sheet grasped between the rotary members by controlling said first dirving means and for selectively setting a direction in which the sheet is to be moved from among a plurlity of directions by controlling said second driving means to rotate said second rotary member around said first rotary member while the sheet is grasped between them.

2. A sheet carrier apparatus according to claim 1, wherein said first and said second rotary members are rotary rollers.

3. A sheet carrier apparatus according to claim 1, wherein said second ratary member is arranged for rotation around the circumference of said first rotary member about a center axis of said first rotary member.

4. A sheet carrier apparatus according to claim 3, wherein said first rotary member has a rotary driving force and said second rotary member moves subordinately to the rotation of said first rotary member.

5. A sheet carrier apparatus according to claim 1, wherein said first and second drive means include a motor.

6. A sheet carrier apparatus according to claim 3, wherein said first rotary member is larger than said second rotary member in size.

7. A sheet carrier apparatus according to claim 1, wherein said apparatus includes a connecting member for connecting a rotation shaft of said first rotary member and a rotation shaft of said second rotary member.

8. A sheet carrier apparatus according to claim 7, wherein said apparatus includes a tensile spring for providing a tensile force between the rotation shaft of said first rotary member and the rotation shaft of said second rotary member.

9. A sheet carrier apparatus according to claim 1, wherein said second rotary member is aranged for rotation around a predetermined shaft different from a center axis of said first rotary member in one piece with said first rotary member.

10. A sheet carrier appartus according to claim 1, further comprising:
    lifting means for lifting sadi second rotary member so as to be separated from said first rotary member in opposition to a tensile force.

11. A sheet carrier apparatus according to claim 10, wherein said apparatus includes a connecting lever for connecting said first and said second rotary members, a rotation shaft of said second rotary member being fitted to a slit provided in said connecting lever, said lever lifting said second rotary member along said slit from said first rotary member.

12. A sheet carrier apparatus according to claim 11, wherein said apparatus includes a tapered member provided on a rotary path of said second rotary member, which applies an amount of rotary driving to said second rotary member and lifts it along the tapered member.

13. A sheet carrier apparatus according to claim 10, wherein said apparatus includes a flexible connecting member for connecting between said first and said second rotary member and lifts said second rotary member from said first rotary member by varying the bending angle of said connecting member.

14. A sheet carrier apparatus according to claim 13, wherein said apparatus includes a tapered member provided on the rotary path of said second rotary member and causes the said second rotary member to rotate along the tapered shape and lifts said second rotary member.

15. A sheet carrier apparatus according to claim 13, wherein said apparatus includes a locking member provided on the rotary path of said second rotary member, causes said second rotary member to be brought into abutment with said locking member and lifts said second rotary member by applying a rotary driving force.

16. A sheet carrier apparatus according to claim 1, wherein after a sheet grasped between said first and said second rotary member is carried a predetermined amount, said second rotary member is rotated to change the direction in which the sheet is to be moved.

17. A sheet carrier apparatus according to claim 16, wherein after a sheet is carried a predetermined amount, a carrying of the sheet by said first and said second rotary member and a changing of the direction in which the sheet is to be moved as the result of the rotation of the said second rotary member about the first rotary member are simultaneously preformed, and wherein a rotary angular velocity of said second rotary member is larger tahn or equal to a rotary angular velocity of said first rotary member.

18. A sheet carrier apparatus according to claim 17, wherein the rotary angular velocity of said second rotary member is larger than the rotary angular velocity of said first rotary member.

19. A sheet carrier apparatus according to claim 1, wherein a carrying of a sheet by said first and seocnd rotary member and a changing of the direction in which the sheet is to be moved as the result of the rotation of said second rotary member about said first rotary member are simultaneously performed, and wherein a rotary angular velocity of said second rotary member is substantially equal to a rotary angular velocity of said first rotary member.

20. A sheet carrier apparatus according to claim 1, wherein a carrying of a sheet by said first and said second rotary member and a changing of the direction in which the sheet is to be moved as the result of the rotation of said second rotary member about the first rotary member are simultaneously performed, and wherein a rotary angular velocity of said second rotary member is smaller than a rotary angular velocity of said first rotary member.

21. A sheet carrier apparatus according to claim 1, further comprising scanning means for scanning a carried sheet with a light beam.

22. A sheet carrier apparatus according to claim 1, further comprising recording means for recording an image on a carried sheet.

23. A sheet carrier apparatus according to claim 22, wherein said recording means includes a laser source.

24. A sheet carrier apparatus according to claim 23, wherein the sheet is a light-sensitive film.

25. A sheet carrier apparatus, comprising:
a first and a second rotary member, at least one of said rotary members having a driving force for forward or reverse rotation by first driving means and capable of carrying a sheet grasped between the rotary members selectively in the forward or reverse direction, said second rotary member being rotatable around said first rotary member by second driving means; and
control means for carrying a sheet grasped between the rotary members in a forward or reverse direciton by controlling said first driving means and for setting a direction in which the sheet is to be moved different from a direction in which the sheet is to be moved different from a direction in which the sheet is inserted to said first and said second rotary member by controlling said second driving means to rotate said second rotary member around said first rotary member while the sheet is grasped between them.

26. A sheet carrier apparatus according to claim 25, wherein said first and said second rotary member are rotary rollers.

27. A sheet carrier apparatus according to claim 25, wherein said second rotary member is constructed so as to be able to rotate around the circumference of said first rotary member about the center axis of said first rotary member.

28. A sheet carrier apparatus according to claim 27, wherein said first rotary member has a rotary driving force and said second rotary member moves subordinately to the rotation of said first rotary member.

29. A sheet carrier apparatus according to claim 22, wherein said first and second driving means include a motor.

30. A sheet carrier apparatus according to claim 27, wherein said first rotary member is larger than said second rotary member in size.

31. A sheet carrier apparatus according to claim 25, wherein said apparatus includes a connecting member for connecting the rotation shaft of said first rotary member and the rotation shaft of said second rotary member.

32. A sheet carrier apparatus according to claim 31, wherein said apparatus includes a tensile spring for providing a tensile force between the rotation shaft of said first rotary member and the rotation shaft of said second rotary member.

33. A sheet carrier apparatus according to claim 25, wherein said second rotary member is constructed so as to be able to rotate around a predetermined shaft different from the center axis of said first rotary member in one piece with said first rotary member.

34. A sheet carrier apparatus according to claim 25, further comprising:
lifting means for lifting said second rotary member so as to be separated from said first rotary member in opposition to said tensile force.

35. A sheet carrier apparatus according to claim 34, wherein said apparatus includes a connecting lever for connecting between said first and said second rotary member, the rotation shaft of said second rotary member being fitted to a slit provided on said connecting lever, and said lever lifting said second rotary member along said slit from said first rotary member.

36. A sheet carrier apparatus according to claim 35, wherein said apparatus includes a tapered member provided on the rotary path of said second rotary member, which applies the amount of rotary driving to said second rotary member and lifts it along the tapered shape.

37. A sheet carrier apparatus according to claim 34, wherein said apparatus includes a flexible connecting member for connecting between said first and said second rotary member and lifts said second rotary member from said first rotary member by varying the bending angle of said connecting member.

38. A sheet carrier apparatus according to claim 37, wherein said apparatus includes a tapered member provided on the rotary path of said second rotary member and causes the said second rotary member to rotate along the tapered shape and lifts said second rotary member.

39. A sheet carrier apparatus according to claim 37, wherein said apparatus includes a locking member provided on the rotary path of said second rotary member, cuases said second rotary member to be brought into abutment with said locking member and lifts said second rotary member by applying a rotary driving force.

40. A sheet carrier appartus according to claim 25, wherein after a sheet grasped between said first and said second rotary members is carried a predetermined amount, said second rotary member is rotated about said first rotary member to change a direction in which the sheet is to be moved.

41. A sheet carrier apparatus according to claim 40, wherein after a sheet is carried a predetermined amount, a carrying of the sheet by said first and said second rotary members and a changing of the direciton in which the sheet is to be moved as the result of a rotation of the said second rotary member about said first rotary member are simultaneously performed.

42. A sheet carrier apparatus according to claim 41, wherein a rotary angular velocity of said second rotary member is larger than or equal to a rotary angular velocity of said first rotary member.

43. A sheet carrier apparatus according to claim 25, wherein a carrying of a sheet by said first and said second rotary members and a changing of a direction in which the sheet is to be moved as the result of a rotation of said second rotary member about said first rotary member are simultaneously performed, and wherein a rotary angular velocity of said second rotary member is substantially equal to a rotary angular velocity of said first rotary member.

44. A sheet carrier apparatus according to claim 25, wherein a carrying of a sheet by said first and said second rotary members and a changing of a direction in which the sheet is to be moved as the result of a rotation of said second rotary member about said first rotary member are simultaneously performed, and wherein a rotary angular velocity of said second ratory member is smaller than a rotary angular velocity of said first rotary member.

45. A sheet carrier apparatus according to claim 25, further comprisng scanning means for scanning a carried sheet with a light beam.

46. A sheet carrier apparatus according to claim 25, further comprising recording means for recording an image on a carried sheet.

47. A sheet carrier apparatus according to claim 46, wherein said recording means includes a laser source.

48. A sheet carrier apparatus according to cliam 46, wherein the sheet is a light-sensitive film.

49. An image recording appartus, comprising:
recording means for recording images on a sheet at a recording position;
first and second driving means;
first sheet housing means for housing recorded sheets;
second sheet housing means which is disposed at a position different from the position of said first sheet housing means for housing recorded sheets;
a first and a second rotary member, at least one of said rotary members having a rotary driving force by said first driving means and capable of carrying a sheet grasped between the rotary members, and said second rotary member being rotatable around said first rotary member by said second driving means; and
control means for carrying a sheet grasped between both the rotary members by controlling said first driving means and for determining the direction in which a sheet is to be carried and selectively supplying recorded sheets to either said first or said second sheet housing means by controlling said second driving means to rotate said second rotary member around said first rotary member while the sheet is grasped between them.

50. An image recording apparatus according to claim 49, wherein said recoridng means includes a light source means which generates a light beam for recording and a scanning optical means which scans with light from said light source in teh direction of main sscanning and performs recording on the sheet.

51. An image recording apparatus according to claim 50, wherein said light source includes a laser light source.

52. An image recording apparatus according to claim 50, wherien said sheet is a light-sensitive film.

53. An image recording apparatus according to claim 49, wherein said apparatus further includes a sub-scanning means which carries a sheet in the direction of sub-scanning intersecting said direction of light scanning during scanning.

54. An image recording apparatus according to claim 53, wherein said second sheet housing means is an automatic developer which automatically develops a sheet.

55. An image recording apparatus according to claim 49, further comprising:
lifting means for lifting said second rotary member so as to be separated from said first rotary member in opposition to said tensile force.

56. An image scanning apparatus, comprising:
scanning means for scanning with a laser beam in the direction of main scanning at a recording position;
first and second driving means;
first sheet housing means for housing scanned sheets;
second sheet housing means which is disposed at a position different from that of said first sheet housing means for scanned sheets;
a first and second rotary member, at least one of said rotary members having a rotary driving force by said first driving means and capable of carrying a sheet grasped between the rotary members, and said second rotary member being rotatable around said first rotary member by said second driving means; and
control means for carrying a sheet grasped between both the rotary members by controlling said first driving means and for determining the direction in which a sheet is to be carried and selectively supplying scanned sheets to either said first or said second sheet housing means by controlling said second driving means to rotate said second rotary member around said first rotary member while the sheet is grasped between them.

57. An image scanning apparatus according to claim 56, wherein a picture image is recorded on a sheet by said scanning means.

58. An image scanning apparatus according to claim 56, wherein a picture image on a sheet is read in by said scanning means.

59. An image recording apparatus, comprising:
a recording means for recording images on a sheet at a recording position;
sheet housing means for stacking and housing recorded sheets;
a first and second driving means;
a first and a second rotary member, at least one of said rotary members having a driving force for forward or reverse rotation by said first driving means and capable of carrying a sheet grasped between the rotary members selectively in the forward or reverse direction, said second rotary member being rotatable around said first rotary member by said second driving means; and
control means for carrying a sheet grasped between said first and second rotary member and supplying it to said recording position, then carrying a recorded sheet in a reverse direction and ejecting ejects the sheet, the direction in which the sheet is to be moved being set in a direction different from the direction in which the sheet is to be inserted to said first and said second rotary member by controlling said second driving means to rotate said second rotary member around said first rotary member while the sheet is grasped between them.

60. An image recording apparatus according to claim 59, wherein said recording means incudes a light source means which generates a light beam for recording and a scanning optical means which scans with light from said light source in the direction of main scanning and performs recording on the sheet.

61. An image recording apparatus according to claim 60, wherein said light source includes a laser light source.

62. An image recording apparatus according to cliam 60, wherein said sheet is a light-sensitive film.

63. An image recording apparatus according to claim 59, wherein said apparatus further includes a sub-scanning means which carries a sheet in the direction of sub-scanning intersecting said direction of light scanning during scanning.

64. An image recording apparatus according to cliam 55, wherein said picture image recording apparatus further includes an automatic developer which also automatically ejects recorded sheets from said automatic developer.

65. An image recording apparatus according to claim 59, further comprising:
lifting means for lifting said second rotary member so as to be separated from said first rotary member in opposition to said tensile force.

66. An image scanning apparatus, comprising:
scanning means for scanning with a laser beam in the direction of main scanning at recording position;
sheet housing means for stacking and housing unused sheets;

a first and second driving means a first and a second rotary member, at least one of said rotary members having a driving force for forward or reverse rotation by said first driving means and capable of carrying a sheet grasped between the rotary members selectively in the forward or reverse direction, said second rotary member by said second driving means; first rotary member by said second driving means; and control means for carrying the sheet grasped between said first and said second rotary member and supplying it to said recording position, then carrying a recorded sheet in a reverse direction and ejecting the sheet, the direction in which the sheet is to be moved being set in a direction different from the direction in which the sheet is to be inserted to said first and said second rotary member by controlling said second driving means to rotate said second rotary member around said first rotary member while the sheet is grasped between them.

67. An image scanning apparatus according to claim 66, wherein a picture image is recorded on a sheet by said scanning means.

68. An image scanning apparatus according to claim 66, wherein a picture image on a sheet is read in by said scanning means.

69. A sheet carrier apparatus, comprising:

a first and a second rotary member, at least one of said rotary members having a rotary driving force by first driving means and capable of carrying a sheet grasped between the rotary members, said second rotary member being rotatable around said first rotary member by second driving means;

sheet housing means for stacking and housing unused sheets;

sheet take-out means for taking out one sheet from inside said sheet housing means and making the sheet be grasped between said second rotary member and said first rotary member positioned in the vicinity of a take-out port of said sheet housing means; and control means for carrying a sheet taken out and grasped by controlling said first driving means until a trailing edge of the sheet leaves said sheet housing means, and for changing a direction in which the sheet is being moved to a predetermined direction by making said second rotary member rotate around siad first rotary member from a position at which the sheet is grasped.

70. A sheet carrier apparatus according to claim 69, wherein said sheet take-out means includes a suction cut for sucking and lifting a topmost sheet of a stack of sheets.

71. A sheet carrier apparatus according to claim 69, further comprising:

lifting means for lifting said second rotary member so as to be separated from said first rotary member in opposition to a tensile force, wherein said control means inserts a leading edge of the sheet between the rotary members when said second rotary member is lifted form said first rotary member, and wherein said second rotary member then is brought into abutment with said first rotary member to grasp the sheet between them.

72. A sheet carrier apparatus according to claim 71, wherein said lifting means lifts said second rotary member in a direction backward with respect to the rotary direction.

73. A sheet carrier apparatus according to claim 69, further comprising:

a guide member disposed in the vicinity of said first rotary member, wherein a sheet taken out of said sheet housing means is brought into abutment with said guide member and guided thereby, and wherein said control means causes said second rotary member to rotate when a sheet is taken out and is brought into abutment with said guide member, grasps a leading edge of a guided sheet between said second rotary member and the guide member, a grasped sheet to said first rotary member, and inserts a supplied sheet between said first and said second rotary members.

74. A sheet carrier apparatus according to claim 73, wherein said guide member is a guide roller.

75. A sheet carrier apparatus having a registration function, the apparatus comprising:

a first and a second rotary member, at least one of said rotary members having a rotary driving force by first driving means and capable of carrying a sheet grasped between the rotary members, said second rotary member being rotatable around said first rotary member by second driving means;

sheet correction emans for performing registration of a carried sheet; and control means for carrying a sheet grasped between said first and said second rotary members when said second rotary member is fixed at a predetermined position, for performing registration by bringing a carried sheet into abutment with said sheet correction means, and for changing a direction in which the carried sheet is to be moved by making said second rotary member rotate about said first rotary member.

76. A sheet carrier apparatus having a registration function, the apparatus comprising:

a first and a second rotary member, at least one of said rotary members having a rotary driving force by first driving means and capable of carrying a sheet grasped between the rotary members, said second rotary member being rotatable around siad first rotary member by second driving means;

sheet housing means for stacking and housing unused sheets;

sheet correction means for performing registration of a carried sheet;

sheet take-out means for taking out one sheet from inside said sheet housing means and making the sheet be grasped between said second rotary member and said first rotary member positioned in the vicinity of a take-out port of said sheet housing means; and control means for carrying a sheet taken out and grasped by driving said at least one rotary member until a trailing edge of the sheet leaves said sheet housing means, for changing a direciton in which the sheet is to be moved to a predetermined direction by making said second rotary member rotate from an initial position to a predetermined position, for reversing a direction of rotation of said at least one rotary member, wherein a carried sheet is carried in a reverse direction, and for bringing a leading edge of the carried sheet into abutment with said sheet correction means so that registration is preformed.

77. A sheet carrier apparatus according to claim 76, wherein said sheet take-out means includes a suction cup for sucking and lifting a topmost sheet of a stack of sheets.

78. A sheet carrier and housing apparatus, comprising:
  a first and a second rotary member, at least one of said rotary members having a rotary driving force by first driving means and capable of carrying a sheet grasped between the rotary members, said second rotary member being rotatable around said first rotary member by second driving means;
  sheet housing means for stacking and housing recorded or read-in sheets;
  detection means for detecting the amount of stacked sheets housed in said sheet housing means; and
  control means for carrying a recorded or read sheet grasped between said first and said second rotary members to said sheet housing means, and for supplying a carried sheet to said sheet housing means by controlling a degree of angular displacement of said second rotary member around said first rotary member according to the amount of stacked sheets detected by said detection means.

* * * * *

UNITED STATES PATENT AND TRADEMARK OFFICE
CERTIFICATE OF CORRECTION

PATENT NO. : 5,210,616  
DATED : May 11, 1993  
INVENTOR(S) : KAWASAKI, ET AL.

Page 1 of 3

It is certified that error appears in the above-indentified patent and that said Letters Patent is hereby corrected as shown below:

COVER PAGE:
   [56] References Cited, "Carol Lynn Draybick" should read --Carol Lynn Druybick--.

COLUMN 11:
   Line 58, "to rotate," should read --,--.

COLUMN 18:
   Line 7, "to" should be deleted.
   Line 19, "gear I09" should read --gear 109--.

COLUMN 19:
   Line 11, "members," should read --member,--.
   Line 13, "dirving" should read --driving--.
   Line 15, "reotary" should read --rotary--.
   Line 18, "dirving" should read --driving--.
   Line 29, "ratary" should read --rotary--.
   Line 52, "aranged" should read --arranged--.
   Line 59, "sadi" should read --said--.

COLUMN 20:
   Line 38, "tahn" should read --than--.
   Line 45, "seocnd" should read --said second--.

COLUMN 21:
   Line 15, "direci-" should read --direction--.
   Line 16, "ton" should be deleted--.
   Line 26, "member" should read --members--.
   Line 37, "claim 22, should read --claim 25,--.

UNITED STATES PATENT AND TRADEMARK OFFICE
CERTIFICATE OF CORRECTION

PATENT NO. : 5,210,616

DATED : May 11, 1993

INVENTOR(S) : KAWASAKI, ET AL.

Page 2 of 3

It is certified that error appears in the above-indentified patent and that said Letters Patent is hereby corrected as shown below:

COLUMN 22:
  Line 23, "cuases" should read --causes--.
  Line 35, "direciton" should read --direction--.
  Line 58, "ratory" should read --rotary--.

COLUMN 23:
  Line 1, "cliam" should read --claim--.
  Line 28, "recoridng" should read --recording--.
  Line 31, "teh" should read --the--; and "sscanning" should read --scanning--.
  Line 58, "for" should read --for housing--.

COLUMN 24:
  Line 31, "ejects" should be deleted.
  Line 47, "cliam" should read --claim--.
  Line 54, "cliam" should read --claim--.
  Line 55, "55," should read --63,--.

COLUMN 25:
  Line 1, "means" should read --means,--.
  Line 7, "member by said" should read --member being rotatable around said--.
  Line 8, "second driving means;" should be deleted.
  Line 48, "siad" should read --said--.
  Line 51, "cut" should read --cup--.
  Line 61, "form" should read --from--.

UNITED STATES PATENT AND TRADEMARK OFFICE
CERTIFICATE OF CORRECTION

PATENT NO. : 5,210,616

DATED : May 11, 1993

INVENTOR(S) : KAWASAKI, ET AL.

It is certified that error appears in the above-indentified patent and that said Letters Patent is hereby corrected as shown below:

<u>COLUMN 26</u>:
Line 12, "a" should read --supplies a--.
Line 25, "emans" should read --means--.
Line 42, "siad" should read --said--.

Signed and Sealed this

Twenty-second Day of March, 1994

BRUCE LEHMAN

Attest:

Attesting Officer

Commissioner of Patents and Trademarks